United States Patent [19]

Van Cleve et al.

[11] Patent Number: 5,728,951
[45] Date of Patent: Mar. 17, 1998

[54] CORIOLIS EFFECT MASS FLOWMETER USING CONCENTRIC ROTORS

[75] Inventors: Craig Brainerd Van Cleve, Lyons; Roger Scott Loving, Boulder, both of Colo.

[73] Assignee: Micro Motion, Inc., Boulder, Colo.

[21] Appl. No.: 744,224

[22] Filed: Nov. 18, 1996

Related U.S. Application Data

[63] Continuation of Ser. No. 404,340, Mar. 15, 1995, abandoned.

[51] Int. Cl.⁶ .................... G01F 1/05; G01F 1/84
[52] U.S. Cl. ................... 73/861.354; 73/861.356
[58] Field of Search .............. 73/861.354, 861.356, 73/861.75, 861.78, 861.79

[56] References Cited

U.S. PATENT DOCUMENTS

| Re. 31,450 | 11/1983 | Smith | 73/861.38 |
|---|---|---|---|
| 2,832,218 | 4/1958 | White | 73/861.354 |
| 2,877,649 | 3/1959 | Powers | 73/861.354 |
| 2,943,487 | 7/1960 | Potter | 73/231 |
| 3,232,110 | 2/1966 | Li | 73/231 |
| 3,350,936 | 11/1967 | Li | 73/861.354 |
| 3,877,304 | 4/1975 | Vetsch | 73/231 |
| 3,958,447 | 5/1976 | Baker et al. | 73/32 |
| 4,012,957 | 3/1977 | Chiles et al. | 73/231 |
| 4,109,524 | 8/1978 | Smith | 73/194 |
| 4,438,648 | 3/1984 | Cheney, Jr. | 73/195 |
| 4,491,025 | 1/1985 | Smith | 73/861.38 |
| 4,570,497 | 2/1986 | Han | 73/861.79 |
| 4,833,925 | 5/1989 | Bullock et al. | 73/861.79 |
| 5,129,264 | 7/1992 | Lorenc | 73/861.42 |

FOREIGN PATENT DOCUMENTS

| 0 579 493 A2 | 1/1994 | European Pat. Off. | G01F 1/84 |
|---|---|---|---|
| 0 485 684 B1 | 6/1994 | European Pat. Off. | G01F 1/10 |
| 1235608 | 3/1967 | Germany . | |
| 0 537 765 A2 | 10/1992 | Germany . | |
| 0 537 765 A3 | 10/1992 | Germany . | |
| 1069466 | 12/1964 | United Kingdom . | |
| WO 94/21990 | 3/1994 | WIPO | G01F 1/82 |

OTHER PUBLICATIONS

Control Engineering Corp., "Mass Rate Flowmeter Measures Gas, Liquid, Or Solids," *Product Engineering*, Sep. 1953.

Brain, T.J.S., "Mass Flow Measurement Methods," *Metron*, vol. 1., No. 1, Jan. 1969.

Wilson, J.P., Jr., "A Survey of Mass Flowmeters," *Instrumentation Technology*, vol. 18, No. 9, Sep. 1971.

*Primary Examiner*—Richard Chilcot
*Assistant Examiner*—Harshad Patel
*Attorney, Agent, or Firm*—Duft, Graziano & Forest, P.C.

[57] ABSTRACT

A Coriolis flowmeter having an outer rotor positioned within a housing and having a recess coaxial with a center axis of rotation. A Coriolis rotor is positioned in the recess of the outer rotor and has a center of rotation coaxial with the center axis of rotation. The Coriolis rotor has a plurality of holes, each of which extends from the outer periphery of said Coriolis rotor to a center recess of said Coriolis rotor. The outer rotor has a plurality of holes, each of which extends from the outer periphery of the outer rotor to the recess of said outer rotor with at least some of said holes in said outer rotor being aligned with a corresponding one of said plurality of said holes in said Coriolis rotor. A fluid inlet extends fluid through holes of both the outer rotor and the Coriolis rotor to a fluid outlet of the flowmeter. Both rotors rotate about the center axis of rotation when fluid is received and passes through the holes of the rotors. Coriolis forces generated by the fluid flowing through the rotor holes and the concurrent rotation of both rotors cause the Coriolis rotor to assume an angular offset from the outer rotor about the center axis of rotation. Sensing coils and magnets generate output signals indicative of the magnitude of the angular offset of the Coriolis rotor and the mass flow rate of the flowing fluid.

40 Claims, 13 Drawing Sheets

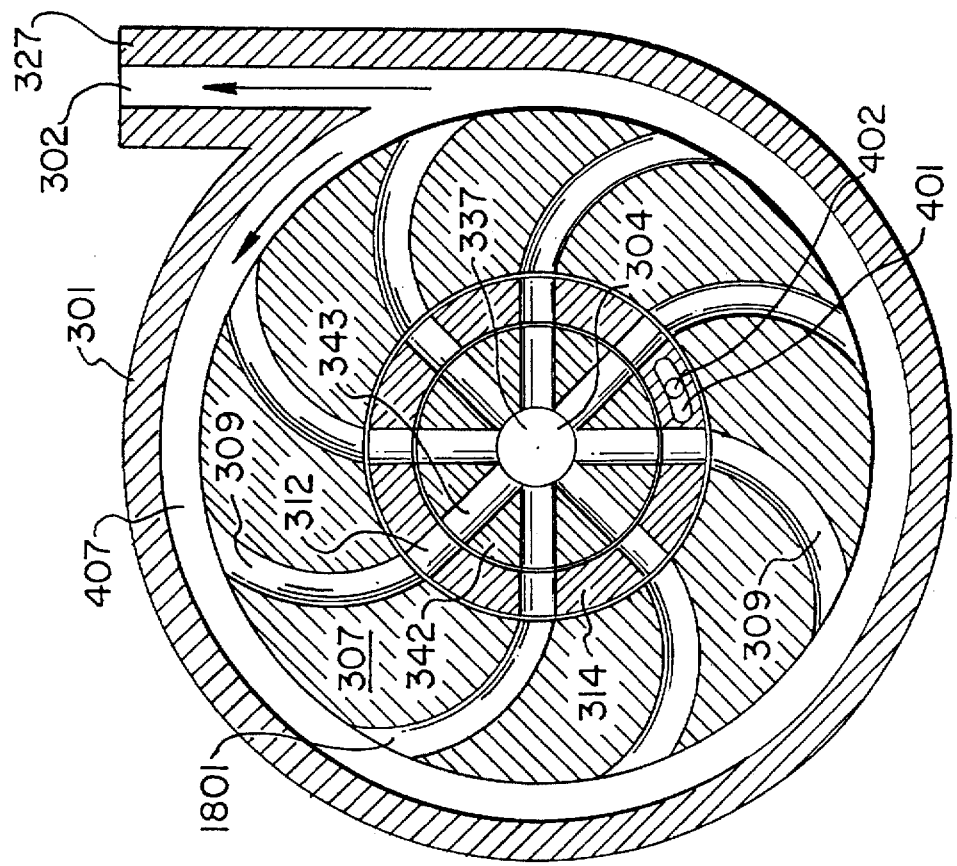
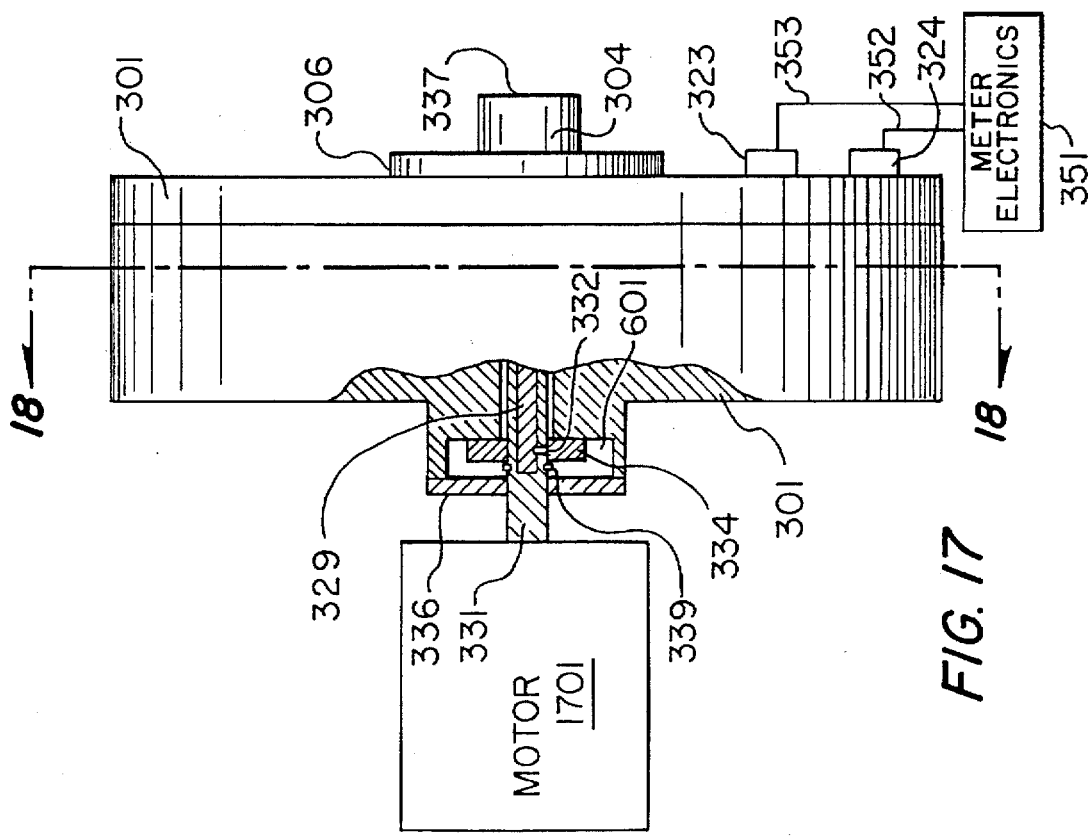
FIG. 18
FIG. 17

CORIOLIS EFFECT MASS FLOWMETER USING CONCENTRIC ROTORS

This application is a file wrapper continuation of application Ser. No. 08/404,340, filed Mar. 15, 1995 now abandoned.

FIELD OF THE INVENTION

This invention relates to a Coriolis effect mass flowmeter and more particularly to a Coriolis effect flowmeter using concentric rotors as phase measuring elements.

PROBLEM

It is known to use Coriolis effect vibrating tube mass flowmeters to measure mass flow and other information for materials flowing through a conduit. Such flowmeters are disclosed in U.S. Pat. Nos. 4,109,524 of Aug. 29, 1978, 4,491,025 of Jan. 1, 1985, and Re. 31,450 of Feb. 11, 1982, all to J. E. Smith et al. These flowmeters have one or more flow tubes of straight or curved configuration. Each flow tube configuration has a set of natural vibration modes, which may be of a simple bending, torsional or coupled type. Each flow tube is driven to oscillate about a pivot point at resonance in one of these natural modes. Material flows into the flowmeter from a connected conduit on the inlet side of the flowmeter, is directed through the flow tube or tubes, end exits the outlet side of the flowmeter.

The natural vibration modes of the vibrating, fluid filled system are defined in part by the combined mass of the flow tubes and the material flowing within the flow tubes. When there is no material flow through the flowmeter, all points along the flow tubes oscillate with identical phase due to an applied driver force. As material begins to flow, Coriolis accelerations cause each point along the flow tube to have a different phase. The phase on the inlet side of the flow tube lags the driver, while the phase on the outlet side leads the driver. Sensors are placed on the flow tubes to produce sinusoidal output signals representative of the motion of the flow tubes. The phase difference between two sensor signals is proportional to the mass flow rate of material through the flow tubes.

A complicating factor in this measurement is that the density of typical process fluids varies. This causes the frequencies of the natural modes to vary. Since the flowmeter's control system maintains resonance, the oscillation frequency varies in response to changes in density. Mass flow rate in this situation is proportional to the ratio of phase difference and oscillation frequency. The above-mentioned U.S. Pat. No. Re. 31,450 to Smith discloses a Coriolis flowmeter that avoids the need for measuring both phase difference and oscillation frequency. The quotient of phase delay and oscillation frequency is determined by measuring the time delay between level crossings of the two sinusoidal output signals of the flowmeter. When this method is used, the variations in the oscillation frequency cancel, and mass flow rate is proportional to the measured time delay. This measurement method is hereinafter referred to as a time delay or Δt measurement.

Information regarding the characteristics of material flowing in a Coriolis mass flowmeter must be derived with great accuracy since it is often a requirement that the derived flow rate information have an accuracy of at least 0.15% of reading. These flowmeter output signals are sinusoidal and are displaced in time or phase by an amount determined by the Coriolis forces generated by the meter through which the material flows. The signal processing circuitry which receives these sensor output signals measures this time difference with precision and generates the desired characteristics of the flowing process material to the required accuracy of at least 0.15% of reading.

The operation of a vibrating tube Coriolis effect mass flowmeter is based on the Coriolis forces generated when a fluid conducting member, such as a pipe or tube, is rotated about an axis perpendicular to the tube axis. Coriolis flow tubes are generally not rotated continuously in the same direction because a rotary seal would be required and the seal drag would introduce errors into the Coriolis force measurement. Instead the flow tubes are vibrated so that they rotate about a pivot point a short distance in one direction followed by a corresponding movement in the reverse direction. The Coriolis force is not measured directly, but rather by measuring the resulting deformation of the flow tubes.

A fundamental problem of the vibrating flow tube design is that the fluid containing member, the flow tube, is also the sensing member that deforms in response to the generated Coriolis force. These dual functions have conflicting criteria. The fluid containment function requires that the flow tube be stiff and strong enough to withstand the fluid pressure. The Coriolis force sensing function requires that the flow tube be thin, flexible and deform significantly in response to the Coriolis forces. Meters designed for small diameter pipelines can meet both criteria by making the flow tube wall thick enough to withstand the fluid pressure and making the flow tubes long enough so as to be flexible despite their thick walls. This design approach does not work on flowmeters suitable for use with large pipelines because the necessary flow tube length would make the flowmeters large and prohibitively expensive.

Another problem with the dual function of the flow tubes is that the fluid pressure tends to stiffen the tube. A stiffer tube is less sensitive to Coriolis force. Thus, the sensitivity of the meter is lowered by increased fluid pressures.

It is known to use rotary mass meters to solve the problems of the vibrating Coriolis flow tube meters. The two basic types of rotary mass meters are angular momentum meters and rotary Coriolis meters. They differ in that the angular momentum type changes angular fluid velocity at constant radial position within the meter flow channel while the rotary Coriolis type changes fluid radial position within the flow channel at constant angular velocity. Both types solve the above problems of vibrating tube meters by separating the functions of fluid containment and flow sensing into two separate elements.

Angular momentum flowmeters often consist of two impellers with different blade angles. The impellers are positioned within a pipe with one impeller upstream of the other. The impellers are coupled by a torsional spring which allows an angular displacement between them. This angular displacement represents a phase difference that is proportional to the change in angular momentum of the fluid and it can be used to determine mass flow rate.

Angular momentum mass flowmeters are shown in the following documents:
U.S. Pat. No. 2,943,487
U.S. Pat. No. 3,232,110
U.S. Pat. No. 3,877,304
U.S. Pat. No. 3,958,447
U.S. Pat. No. 4,012,957
U.S. Pat. No. 4,438,648
British Patent 1069466
European Patent 0485684B1
PCT document WO 94/21990
*A Survey of Mass Flowmeter* by M. P. Wilson, Jr., pp. 63–68.
Instrumentation Technology, September 1971

Angular momentum meters suffer from two basic problems. The first is their sensitivity to the velocity profile of the incoming fluid in the flowmeter pipe. This sensitivity exists because the measured quantity of these meters, torque, is the product of force and radial distance. Fluid flowing down the center of the pipe, because of the small radius, produces less torque on the impeller sensors than the same flow near the periphery of the pipe. These meters also suffer inaccuracies due to the effects of viscosity of the fluid. Viscous drag on the impellers and tube walls changes the resultant angular fluid momentum, the velocity profile, and the torque between the impellers.

It is also known to use Coriolis type rotary mass flowmeters in order to solve the velocity profile problem. These meters utilize Coriolis force instead of angular momentum of the flowing fluid to measure mass flow. These rotary Coriolis meters maintain constant fluid angular velocity while moving the fluid radially. These meters also use motor driven rotors having radial holes through which the fluid flows. At a fixed rotation rate, the torque required for the motor to spin the rotors is ideally proportional to the mass flow rate through the radial holes. The rotor torque is therefore directly proportional to mass flow rate and rpm. Unfortunately, the drag due to seals, bearings, and viscosity add to the rotor torque and introduce measurement errors. The use of a motor also results in a meter that cannot be made intrinsically safe in many applications. Coriolis rotary mass flowmeters are shown in above Wilson article as well as in the article "Mass Rate Flowmeter Measures Gas, Liquid, or Solids in Product Engineering," p. 211, September 1953.

SOLUTION TO THE PROBLEM

The present invention solves the problems of rotary Coriolis flowmeters by the provision of a phase measuring rotor system having an outer rotor, an inner (Coriolis) coaxial rotor and a flexible torsion bar axle connecting the two rotors. The mass flow rate through the flowmeter is determined by measuring the rotational displacement between the outer rotor and the Coriolis rotor. Both rotors fit concentrically within a sealed containment housing having a fluid inlet and a fluid outlet. The outer rotor has a hollowed out recess into which the Coriolis rotor fits. A cover is fastened onto one side of the outer rotor to enclose the Coriolis rotor. The fluid flowing through aligned holes spins the rotors and imparts a torque to the rotors that is proportional to the fluid mass flow rate. This torque applies equally to both the outer and Coriolis rotors. The outer rotor also experiences the viscous, bearing, and seal drag torques plus the drive torque, in some embodiments of the invention. The Coriolis rotor, because it spins at the same rate as the outer rotor which envelopes it, experiences none of these drag torques, but only experiences Coriolis torque. The resultant angular deflection of the Coriolis rotor with respect to the outer rotor is proportional to mass flow rate.

The center of the Coriolis rotor is also hollowed out so that it can house a fluid shear decoupler which is fastened to the rotor cover and rotates at the same rate. The shear decoupler ensures that the Coriolis rotor experiences no forces due to the viscosity or angular momentum of the fluid in the central inlet/exit port. Clearances exist on all sides of the Coriolis rotor so that it is free to rotate coaxially with respect to the outer rotor except to the extent that it is restrained by the torsion bar. Fluid conducting holes are formed in both the outer rotor and the Coriolis rotor and in the fluid shear decoupler. In the fluid exit/inlet port on the cover disc, these holes converge and emerge axially as one hole through which fluid enters or exits the meter. The radial holes in the outer rotor, the Coriolis rotor, the shear decoupler and the exit/inlet port on the cover disc are aligned so that fluid can flow through them.

A number of different embodiments are disclosed by means of which a dual rotor system comprising an outer rotor and inner coaxial Coriolis rotor are used to derive mass flow rate information by measuring the amount by which the Coriolis rotor is angularly offset from the outer rotor about a common axis coaxial to the two rotors. A first possible alternative embodiment receives fluid via an inlet tangential to an inner surface of the flowmeter casing and directs the fluid through radial holes in both the outer rotor and Coriolis rotor. The holes of the Coriolis rotor extend the fluid to mating holes in the fluid shear decoupler which rotates with the outer rotor and which transforms the fluid from radial flow as received from the holes of the Coriolis rotor to an axial flow that is applied to the fluid outlet of the flowmeter. The fluid shear decoupler thereby isolates the Coriolis rotor from forces to which it would be subjected if the fluid was applied directly by the holes of the Coriolis rotor to the meter outlet for axial delivery to the pipeline to which the flowmeter is connected.

In accordance with another embodiment of the invention, the holes in the Coriolis rotor are radial, while the holes in the outer rotor have a 90° bend. The inner opening of each such hole in the outer rotor faces the outer end of a corresponding radial Coriolis rotor hole. The other opening of each such outer rotor hole comprises a protrusion on the periphery of the outer rotor. The outer rotor spins in a direction that enables the opening on the periphery of the outer rotor to act as a scoop which "scoops up" the received the fluid and forces it through the radial holes of the Coriolis rotor with a greater pressure than does for the apparatus of the first embodiment wherein the inlet openings of the radial holes in the outer rotor are flush with the periphery of the outer rotor.

In accordance with yet another embodiment of the invention, the holes in the Coriolis rotor are radial while the holes in the outer rotor comprise 90° like elements, having an open end on the inner circumference of the outer rotor for cooperation with a corresponding hole in the Coriolis rotor. These 90° elements have a smaller opening flush with the outer periphery of the outer rotor and configured to perform a jet function. Fluid enters the meter coaxially through the fluid shear decoupler near the inner end of the Coriolis rotor holes, travels through the Coriolis rotor radial holes and passes through the non-radial holes in the outer rotor including the jet openings of each 90° element.

Another possible embodiment of the invention comprises an inline flowmeter having coaxial fluid inlets and outlets. The axis of rotation of each rotor is coaxial with the fluid inlet and outlets and a flow diverter is provided for receiving the axial fluid flow from the inlet and for applying this fluid flow tangentially to the periphery of the outer rotor and the holes therein.

Another embodiment has inline inlets and outlets with the received fluid being applied through a fluid shear decoupler, through radial holes of a Coriolis rotors and through matching holes in outer rotor to the fluid exit.

In accordance with another embodiment of the invention, the holes in the Coriolis and outer rotors are not radial, but instead are curved in a plane that includes the line of the center axis of rotation of the rotors. This curvature does not effect the rotation of either the Coriolis or the outer rotor.

In accordance with another embodiment of the invention, a motor is connected to the embodiment having Jet-like openings in the outer rotor so as to provide a higher rpm for the rotor system. This provides improved output signals that are used to measure the angular displacement between the Coriolis rotor and the outer rotor.

In accordance with yet another embodiment of the invention, the Coriolis rotor and the outer rotor are rotated by a motor to perform the dual functions of a fluid pump and a mass flow measurement device for providing mass flow information for the fluid delivered by the pump. The holes in the outer rotor are curved in a manner that enhances the pumping capability of the rotor system.

In all embodiments, sensing coils and magnets provide output information indicating the rotational displacement of the Coriolis rotor with respect to the outer rotor. A first set of magnets is embedded in the Coriolis rotor while a second set of magnets is embedded in apparatus that rotates in unison with the outer rotor. A first sensing coil senses the motion of each set of the first set of magnets while a second sensing coil senses the motion of the second set of magnets. Each coil produces a periodic wave output with the phase difference between the two outputted waves being proportional to the angular displacement of the Coriolis rotor with respect to the outer rotor and, in turn, proportional to the mass flow rate of the fluid flow within the flowmeter.

All embodiments of the invention provide a mechanical means which limits the rotational amount by which the Coriolis rotor can be offset from the outer rotor. This is desirable in order that the torsion bar shaft, by means of which the Coriolis rotor is attached to the outer rotor, will not be subjected to undue acceleration forces during start-up and shut down of the flowmeter.

DESCRIPTION OF THE DRAWINGS

FIGS. 17 and 18 disclose an alternative embodiment comprising a motor driven combined flowmeter and pump.

DETAILED DESCRIPTION

Figure 1:
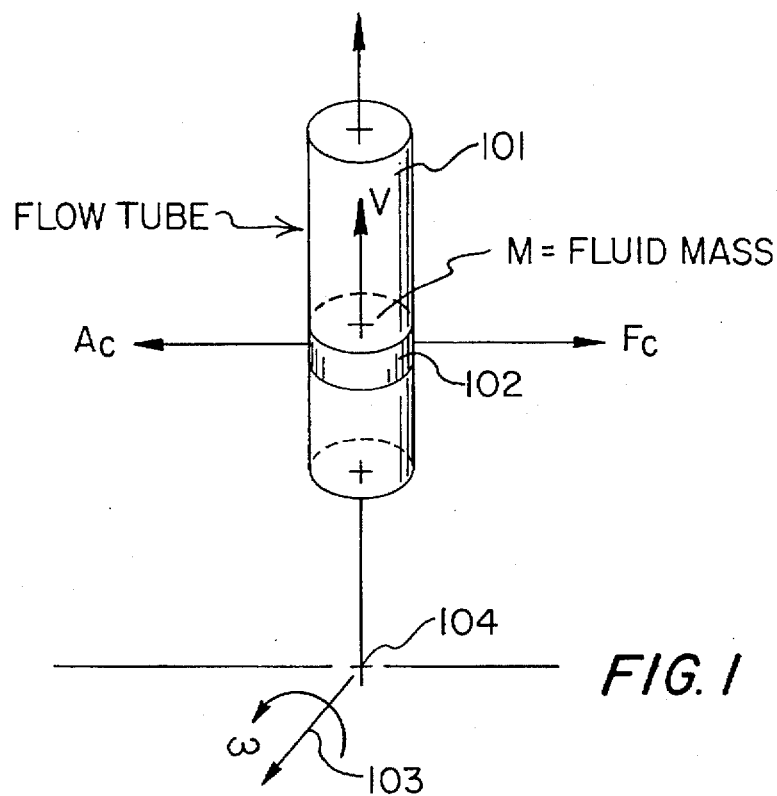
FIGS. 1 and 2 illustrate physical forces associated with the operation of a Coriolis flowmeter.

FIG. 1 discloses a flow tube 101 having a slug of fluid mass 102 flowing therethrough at a velocity V. Flow tube 101 is assumed to rotate at an angular velocity ω about pivot point 104. In vibrating Coriolis flowmeters, the rotation of flow tube 101 about pivot point 104 is not continuous but, rather, the rotation comprises an oscillatory motion wherein flow tube 101 rotates about pivot point 104 briefly in one direction followed by a return rotation in the opposite direction. The reason for this is that it is not feasible with conventional flowmeters to rotate the flow tubes continuously due to mechanical problems such as the provision of the required seals and the resulting drag imposed by the seals. However, this limitation is overcome by the apparatus of the present invention.

Figure 2:
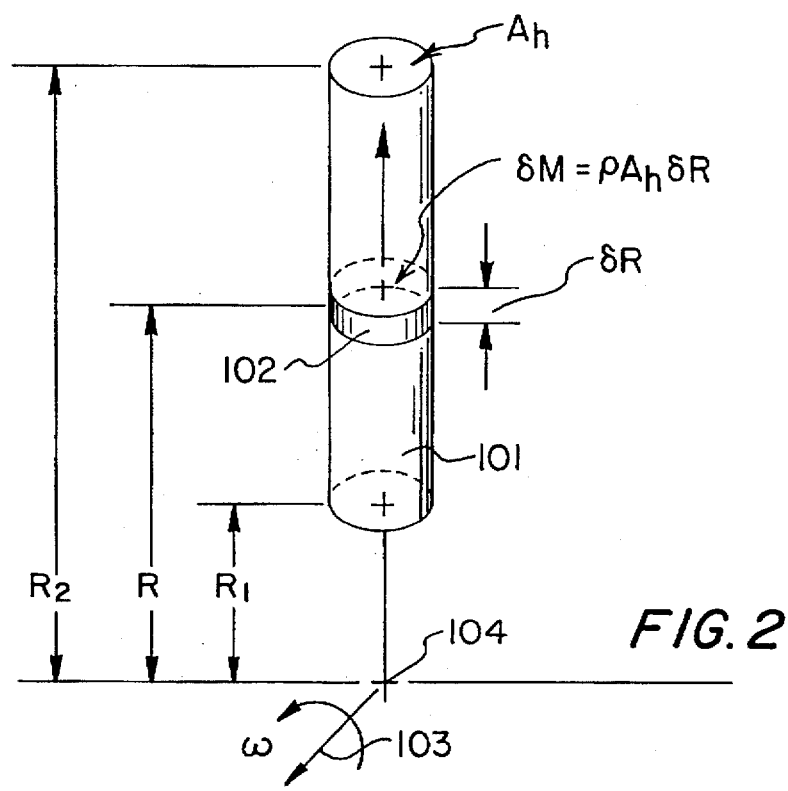

The description of the flow tube 101 of FIGS. 1 and 2 assumes that the flow tube 101 is rotating counterclockwise at an angular velocity ω about pivot point 104 as defined by vector ω. Under this condition, the slug of fluid mass 102 is subject to a Coriolis acceleration $A_c$ as it moves away from pivot point 104 at a velocity V. Since it is the walls of flow tube 101 that enable the slug of fluid mass 102 to undergo the Coriolis acceleration, the walls of the flow tube 101 are subject to the Coriolis force $F_c$.

The generated Coriolis force $F_c$ as shown in FIG. 1 may be expressed as follows:

$$F_c = MA_c \quad (1)$$

where
$F_c$=Coriolis force on the tube
M=fluid mass
$A_c$=Coriolis Acceleration.

From the laws of physics, the Coriolis Acceleration $A_c$ may be expressed as:

$$A_c = 2(\omega \times V) \quad (2)$$

where
ω=flow tube angular velocity
V=fluid velocity

Substituting equation 2 into equation 1, the Coriolis force on the flow tube may be expressed as:
expressed as:

$$F_c = M \times 2(\omega \times V) \quad (3)$$

The Coriolis acceleration $A_c$ is the rate of change of tangential velocity to which the slug of fluid mass 102 is subjected as it travels at a velocity V through the flow tube 101 away from the pivot point 104. Equation 2 may be intuitively understood by appreciating that the slug of fluid travels a finite distance during an interval of time δt and that during this time interval, the distance of the slug of fluid 102 from the pivot point 104 increases. If the slug of fluid 102 was originally at a distance R from the pivot point 104 then, after a time interval δt, the slug of fluid will be at a distance R+δR from pivot point 104. The tangential velocity of any point on the flow tube is a function of the angular velocity ω at which the flow tube is rotating times its distance from pivot point 104. At the end of interval δt, the slug of fluid 102 is further from the pivot point 104 by the amount δR. This being the case, the slug of fluid 102 is traveling at a greater angular velocity after the time interval δt when its distance is R+δR from the pivot point, than it was at the beginning of the time interval when its distance from the pivot point was R. This increase in the tangential velocity divided by the time interval δt equals the Coriolis acceleration $A_c$ of the slug of fluid mass 102. The linear velocity V of the fluid mass of slug 102, of course, remains constant during this time interval even though the slug of fluid mass 102 increases its tangential velocity as it travels further and further from pivot point 104.

From Equation 3 it can be seen that the Coriolis force $F_c$ shown in FIG. 1 is proportional to the mass M of the fluid flowing in flow tube 101, as well as to the angular velocity $\omega$ at which the flow tube 101 pivots about a pivot point 104 as well as proportional to the velocity V at which the fluid mass travels through the flow tube.

It has been mentioned that Coriolis mass flowmeters of the rotary type are known wherein the angular velocity of a fluid is held constant while the fluid transverses a radial path. This is achieved by the provision of a rotor having radial holes through which the fluid flows. The prior art rotary Coriolis mass flowmeters generally use a motor to spin the rotor through which the fluid flows. Some embodiments of the rotary Coriolis flowmeter of the present invention do not use a motor but, rather, use the dynamics of the flowing fluid to spin the rotor.

FIG. 2 and the following discussion describes the forces applied to and associated with a spinning rotor as fluid flows through radial holes (or tubes) in the rotor. On FIG. 2, $A_h$ is the area of the interior portion of flow tube 101 of FIG. 1. The slug of fluid mass 102 equivalent to the slug of fluid mass 102 of FIG. 1 and this has a thickness $\delta R$ and a cross sectional area $A_h$. The mass of this slug 102 may be expressed as $\epsilon A_h \delta R$ where $\epsilon$ equals the density of the material comprising slug 102, where $A_h$ is the cross sectional area of the slug 102 and where $\delta R$ is the thickness of slug 102.

The lower portion of flow tube 101 is at a distance R1 from the axis 103 containing a pivot point 104. Slug 102 is at a distance R from the pivot point 104 while the top extremity of the flow tube 101 is at a distance R2 from the pivot point 104.

The following describes the torque to which flow tube 101 is subjected due to Coriolis acceleration as fluid flows continuously through flow tube 101. Flow tube 101 is assumed to be a radial hole of a rotor shown on FIG. 3 (but not on FIG. 2).

From the laws of mechanics, the torque on the flow tube 101 may be expressed as:

$$\tau = R \times F_c \tag{4}$$

$\tau$=torque on rotor
R=radius to point of application of force
$F_c$=Coriolis force Substituting the value of the Coriolis force $F_c$ obtained in Equation 3, the rotor torque may be expressed as follows:

$$\tau = 2RM(\omega \times V) \tag{5}$$

Equation 5 must be expressed in differential form to sum the total torque over the length of tube.

$$\delta\tau = 2R\delta M(\omega \times V) \tag{6}$$

It can be seen that the mass of an incremental portion of the fluid slug 102 of FIG. 2 is equal to:

$$\delta M = \rho A_h \delta R \tag{7}$$

$\rho$=fluid density
$A_h$=hole section area

Substituting the value of $\delta M$ of Equation 7 into Equation 6 one gets:

$$\delta\tau = 2R\rho A_h \delta R(\omega \times V) \tag{7.5}$$

The total rotor torque is obtained by taking the integral of equation 7.5 from the radius R1 to R2 of FIG. 2. The following expression is then obtained:

$$\tau = \int_{R_1}^{R_2} 2R\rho A_h \omega V \delta R \qquad \text{Eq. 8}$$

where
$R_1$=rotor 101 inside radius
$R_2$=rotor 101 outside radius
$\omega$ and V are perpendicular and they can be simply multiplied as scalars.

The mass flow rate of flowing material, such as that shown for slug 102 in FIG. 2, may be derived as follows:

$$\delta M = \rho A_h \delta R \qquad \text{Eq. 8.1}$$

$$\frac{\delta M}{\delta t} = \rho A_h \frac{\delta R}{\delta T} \qquad \text{Eq. 8.2}$$

$$\text{but } \frac{\delta R}{\delta t} = V$$

$$\text{and } \frac{\delta M}{\delta t} = \dot{M}$$

$\dot{M}$ = mass flow rate

Therefore $\dot{M} = \rho A_h V \qquad \text{Eq. 9}$

Substituting the term $\dot{M}$ of Equation 9 for the terms $\rho A_h V$ in Equation 8, the following expression is obtained:

$$\tau = 2 \int_{R_1}^{R_2} \dot{M} \omega R \delta R \qquad \text{Eq. 10}$$

Equation 10 may be simplified as follows:

$$\tau = 2\dot{M}\omega \int_{R_1}^{R_2} R \delta R \qquad \text{Eq. 10.5}$$

Completing the integration, the following expression is obtained for the torque $\tau$ on the flow tube 101 of FIG. 2:

$$\tau = \dot{M}\omega(R_2^2 - R_1^2) \tag{11}$$

Equation 11 shows that the torque on a rotating tube, such as flow tube 101 of FIG. 2, is directly proportional to the mass flow rate of the moving fluid as well as to the angular speed (rotation) of the rotor. The mass flow rate is determined by measuring the load on a motor of the prior art motor driven rotary Coriolis flowmeters. However, the drag due to seals, bearings, and viscosity alter the rotor torque and can introduce errors in the determination of the mass flow rate of these prior art devices.

In accordance with some embodiments of the invention, a rotary Coriolis mass flowmeter is provided in which the moving fluid drives the rotors of the flowmeter. This enables the flowmeter to be intrinsically safe for all applications and to avoid problems inherent to shaft seals. In one embodiment of the invention, the fluid flows into the flowmeter housing tangential to an outer rotor, through radial holes in the outer rotor, through radial holes in an inner (Coriolis) rotor, and out an axial outlet of the flowmeter at the center of a cover of the outer rotor. Neglecting drag for a moment, the angular momentum of the incoming fluid is conserved so that the fluid in the rotors has the same average specific angular momentum as the incoming fluid. Because of this, the rotor angular velocity, the Coriolis torque, and the Coriolis rotor angular displacement with respect to the outer rotor can be measured and calculated to determine the mass flow rate of the fluid.

EMBODIMENT OF FIGS. 3, 4, 5, 6 & 7

Figure 3:
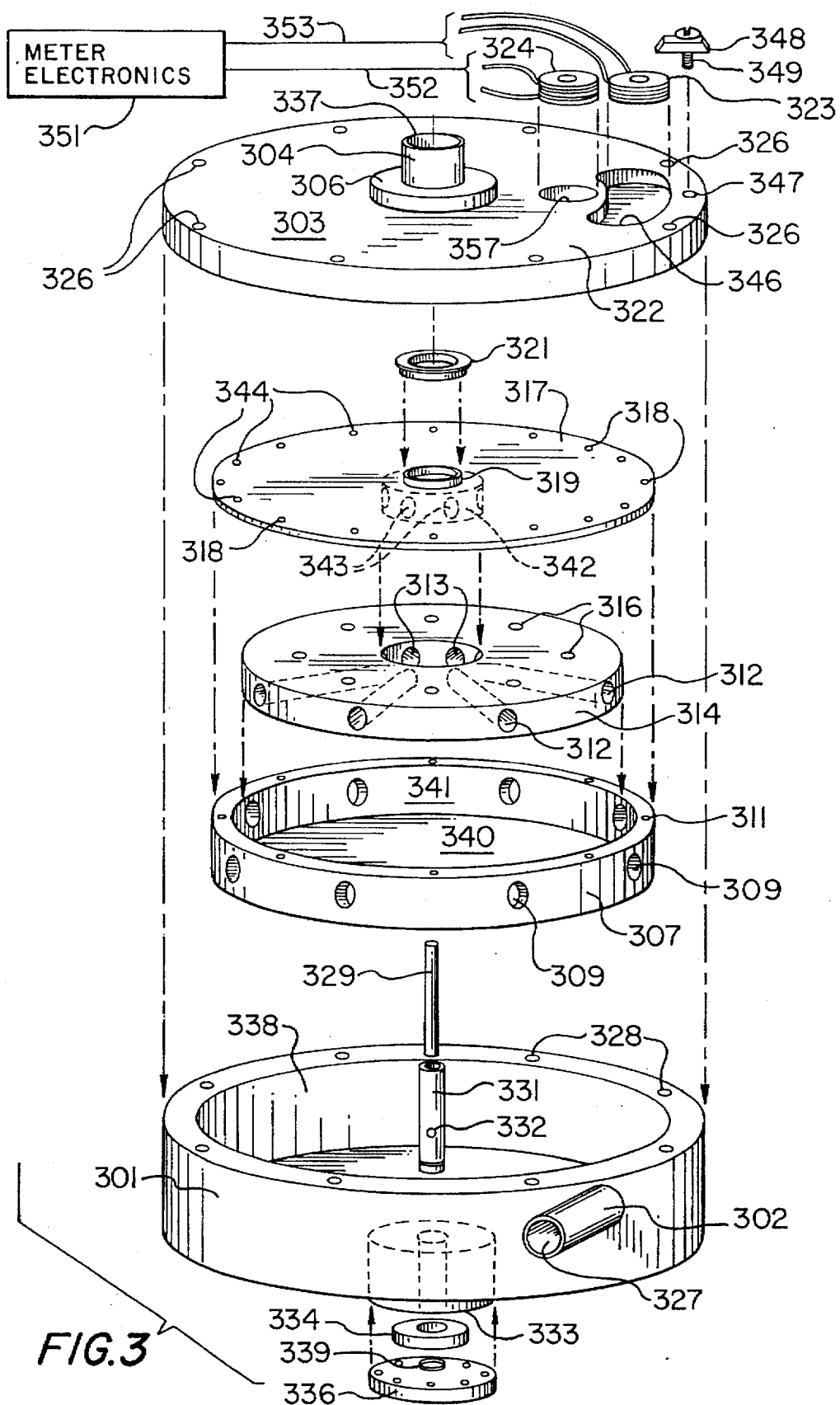
FIG. 3 is an exploded view of one possible exemplary embodiment of the invention.

FIG. 3 discloses an exploded view of a first possible preferred exemplary embodiment of the invention. This embodiment comprises a cylindrical shaped fluid containment housing 301, an outer rotor 307, an inner or Coriolis rotor 314, a rotor cover 317, and a housing cover 303. Inlet 302 having opening 327 comprises a portion of the fluid containment housing 301 while outlet 304 having opening 337 is affixed to top housing cover 303 by flange 306. In use, outer rotor 307 and Coriolis rotor 314 are positioned within the recess 338 of fluid container housing 301. Axle 331 is fixably attached at its upper end to the flat portion 340 of outer rotor 307 and on its lower end rotably engages thrust bearing 334 and bearing cup 333 having circlip 339. Bearing cap 336 attaches to housing 301 connecting the axle to the housing. By this means, outer rotor 307 can rotate freely with its axle 331 and it is positioned within fluid containment recess 338 of housing 301.

Torsion bar axle 329 comprises an elongated flexible torsion bar that is positioned within the open center portion of axle 331 and is fixably attached thereto by means of set screw 332. Torsion bar axle 329 extends through an opening (not shown in FIG. 3) in the flat portion 340 of outer rotor 307 and is connected to the bottom portion of Coriolis rotor 314 by a press fit as shown in detail on FIG. 6. In use, Coriolis rotor 314 is positioned within the recess 341 of outer rotor 307 and is rigidly affixed to the top portion of torsion bar axle 329. The flexing capability of torsion bar axle 329 permits Coriolis rotor 314 to rotate angularly a limited amount with respect to outer rotor 307. This angular rotation of Coriolis rotor 314 with respect to outer rotor 307 is limited by elements subsequently described in detail in connection with FIGS. 4 and 5.

The top surface of rotor cover 317 includes a boss 319 which receives seal 321 which cooperates with a bottom portion of fluid outlet 304. The top portion of seal 321 abuts the bottom of housing cover 303. Seal 321 ensures that fluid must flow through holes 309 and 312 of rotors 307 and 314 to reach fluid exit 304. The top surface 322 of housing cover 303 includes openings 357 and 346 which receive coils 323 and 324 which are used as subsequently described to determine the angular displacement between Coriolis rotor 314 and outer rotor 307 as fluid flows through the flowmeter of FIG. 3.

In use, Coriolis rotor 314 is positioned within the recess 341 of outer rotor 307. Rotor cover 317 is then affixed by means of screws to the top surface of outer rotor 307 by means of its screw holes 311 and 318. The subassembly is then positioned within recess 338 of housing 301. Housing cover 303 is affixed by means of screws and screw holes 326 and 328 to the top surface of fluid containment housing 301. The assembled flowmeter is then connected to a pipeline (not shown) with the supply portion of the pipeline being connected to fluid inlet 302 and with the downstream portion of the pipeline being connected to fluid exit 304. The passage of moving fluid through the opening 327 of inlet 302 to the inner portion of the housing 301 causes outer rotor 307 and Coriolis rotor 314 to rotate counterclockwise as the fluid travels through radial holes 309 of outer rotor 307, through radial holes 312 of Coriolis rotor 314, and through the holes 343 of fluid shear decoupler 342 which is fixably attached to the lower surface of the rotor cover 317. The fluid proceeds upwards through the fluid exit port 304 to the pipeline being served by the flowmeter.

The flow of fluid through radial holes 309 and 312 of rotors 307 and 314 causes them to rotate counterclockwise. In so doing, Coriolis rotor 314 becomes angularly offset with respect to outer rotor 307 because of the Coriolis forces to which Coriolis rotor is subjected. This angular offset is permitted by the torsional capabilities of torsional axle 329. Coil 323 cooperates with magnets 344 embedded in rotor cover plate 317. Coil 324 cooperates with magnets 316 embedded in Coriolis rotor 314. Each coil generates output signals on paths 352 and 353 as the magnets with which it cooperates pass the coil. The output signal of each coil comprises a periodic wave due to the plurality of magnets with which each coil cooperates. The signals on paths 352 and 353 are applied to meter electronics 351 which determines mass flow rate and other information in response to the receipt of the signals 352 and 353.

Coil 324 is positioned in opening 357. Coil 323 is controllably positionable within opening 346. This permits the position of coil 323 to be adjusted so that the periodic wave outputs of the two coils are coincident with each other during the no flow condition of the meter. This is necessary for calibration purposes. The position of coil 323 within opening 346 is locked by means of retainer element 348 and screw 349 which are screwed into opening 347 with the bottom of retainer element 348 being clamped to the top surface of coil 323 to prevent its further movement. Once calibrated, the output signals of the two coils are coincident with each other for the no flow condition of the flowmeter but are offset or phase displaced with respect to each other for flow conditions. This phase offset is proportional to the mass flow rate of the material flowing in the flowmeter and is used by meter electronics 351 to determine the mass flow rate of the material.

Figure 4:
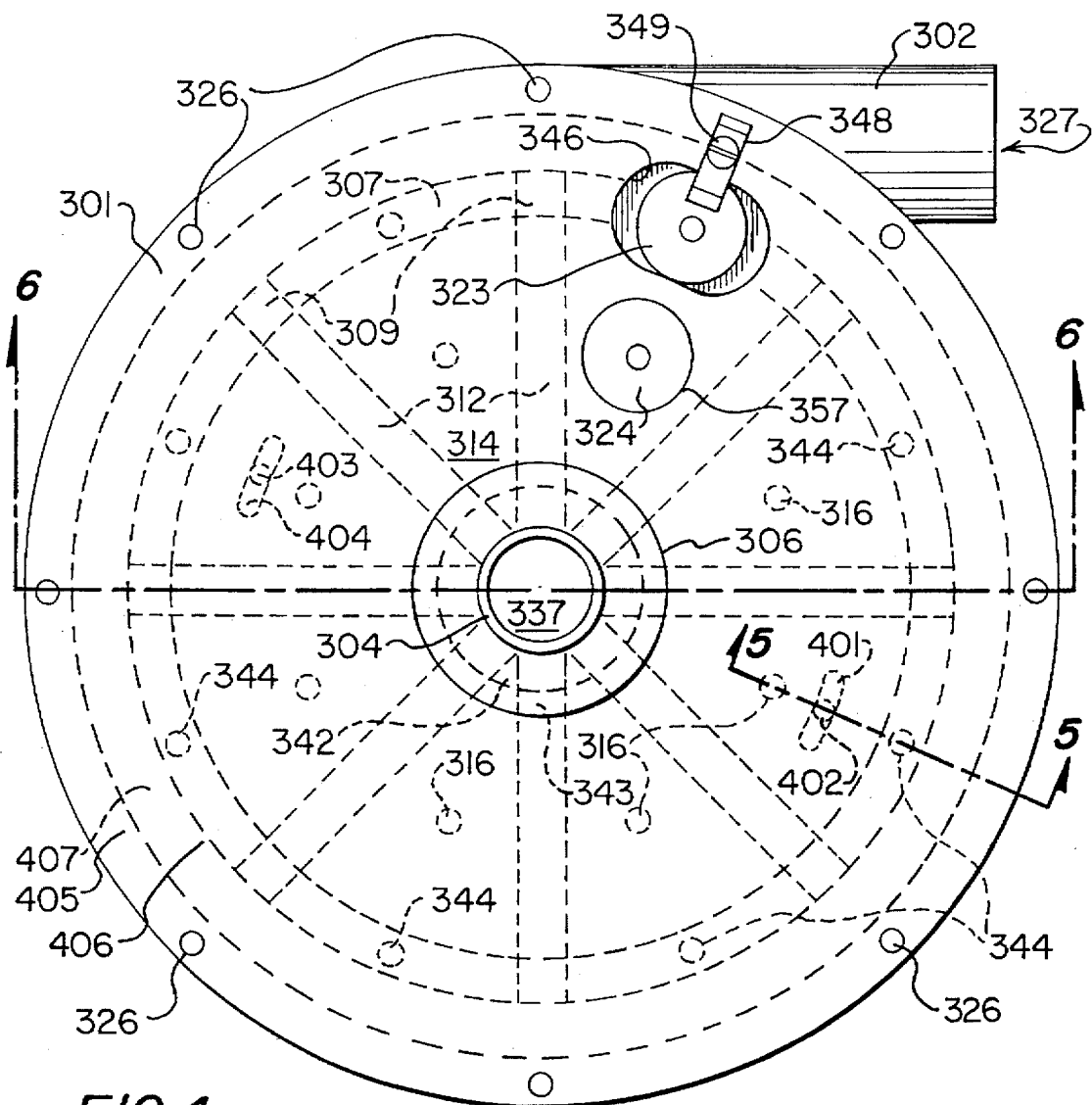
FIG. 4 is a top view of the apparatus of FIG. 3.

FIG. 4 discloses further details of the structure of FIG. 3 and, in particular, comprises a top view of the structure of FIG. 3. Shown on FIG. 4 is the circular fluid containment housing 301 having inlet 302 with its opening 327. Fluid from the supply portion of the pipeline (not shown) passes through opening 327 and enters the interior of fluid containment housing 301. The fluid travels counterclockwise as shown on FIG. 4. The fluid enters the space 407 which is formed between the inner cylindrical surface 405 of housing 301 and the periphery 406 of outer rotor 307. The fluid proceeds counterclockwise in circular area 407 and enters the openings of radial holes 309 in outer rotor 307. As the fluid ultimately enters radial holes 309 in outer rotor 307 and from there passes through the corresponding holes 312 in Coriolis rotor 314. The fluid travels towards the center of the Coriolis rotor 314 and ultimately encounters openings 343 in fluid shear decoupler 342. An opening 343 of fluid shear decoupler 342 mates with each radial hole 312 in Coriolis rotor 314. In so doing, fluid shear decoupler 342 receives fluid from the plurality of radial holes 312 in rotating Coriolis rotor 314 and redirects the flowing fluid to converge into a single axial path comprising opening 304 of exit outlet 337.

The plurality of screw holes 326 fasten housing cover 303 to the top surface of fluid containment housing 301. Further shown on FIG. 4 are the plurality of magnets 316 in the Coriolis rotor 314 as well as the plurality of magnets 344 embedded in rotor cover 317. Each magnet 344 is positioned in the rotor cover 317 so as to alternate with a threaded screw hole 318 as shown on FIG. 3 but not on FIG. 4. In other words, screw holes 318 and the magnets 344 are in alternate positions near the periphery of rotor cover 317. Coil 324 senses the motion of magnets 316 while coil 323 senses the motion of magnets 344. Elements 349 and 348 permit the position of coil 323 to be controllably adjusted within opening 346. The position of coil 324 is not adjustable and it fits snugly within opening 357.

Figure 5:
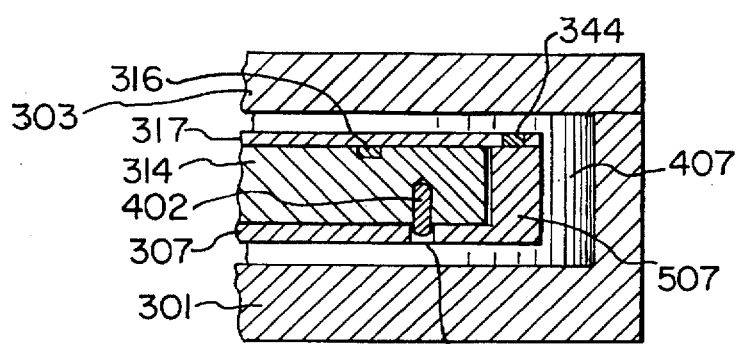
FIG. 5 is a cross-sectional view taken along lines 5—5 of FIG. 4.

FIGS. 4 and 5 show pin 402 positioned within recess 401 in Coriolis rotor 314. As shown in FIG. 5, the top of pin 402 is embedded in Coriolis rotor 314 while the bottom of pin 402, as shown in FIG. 4, is positioned within opening 401. Pin 402 and opening 401 limit the amount by which rotors 314 and 307 may be angularly displaced from one another. This limitation on angular displacement limits stresses on torsional axle 329. It is particularly useful during start up conditions when the displacement of Coriolis rotor 314 might otherwise be large enough to damage torsional axle 329. Other mechanical embodiments are possible. Thus, pin 402 could be embedded in Coriolis rotor 314 and extend into an opening in outer rotor 307. Also, pin 402 could be embedded in outer wall 507 of rotor 307 and extend sideways on FIG. 5 into an opening in the periphery of Coriolis rotor 314. Pin 403 and opening 404 provide a similar limit on Coriolis rotor 314 angular displacement in the same manner as does pin 402 and opening 401. Fluid space 407 comprises the space between wall 507 of outer rotor 307, the outer rotor cover 317, and the interior surface of fluid containment housing 301, including the lower surface of the housing cover 303.

Figure 6:
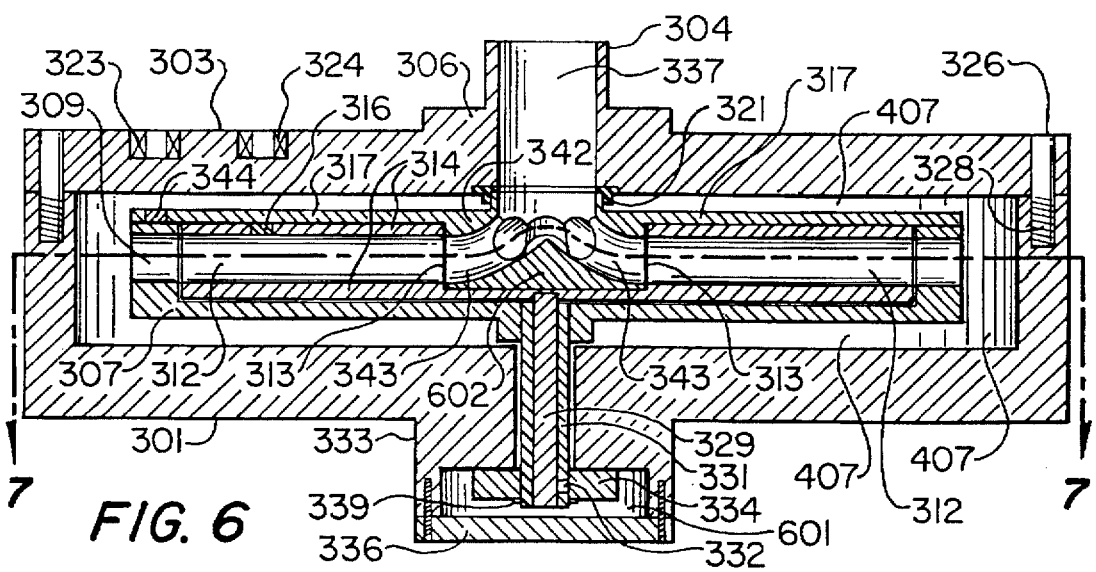
FIG. 6 is a cross-sectional view taken along lines 6—6 of FIG. 4.

FIG. 6 shows further details of the apparatus of FIG. 3. It comprises a vertical cross-sectional view taken along line 6—6 of FIG. 4. Shown on FIG. 6 is fluid containment housing 301 containing outer rotor 307, Coriolis rotor 314, together with radial holes 309 in outer rotor 307 and holes 312 in Coriolis rotor 314. The top portion of axle 331 is fixably attached to the lower portion of outer rotor 337 and its bottom is affixed by means of circlip 339 to thrust bearing 334. This entire assembly is positioned within bearing cup 333 which includes an opening 601 for receiving grease or the like and which separates the upper portion of bearing cap 336 from the thrust bearing 334 and the bottom of axle 331. Inside of and coaxial with axle 331 is the torsion axle 329 which on its bottom portion is affixed by means of said screw 332 to axle 331 and which on its upper portion is rigidly affixed to the bottom portion of Coriolis rotor 314. Fluid in space 407 comprises the space between the inner portion of housing 301 and outer rotor 337 and rotor cover 317. Coils 323 and 324 are shown positioned within housing cover 303. The associated magnets 344 and 316 are shown embedded, respectively, in rotor cover 317 and the top portion of the Coriolis rotor 314, respectively.

Fluid shear decoupler 342 is shown in detail in FIG. 6. Holes 343 of fluid shear decoupler 342 receive fluid flow from the inner portion 313 of radial holes 312 in Coriolis rotor 314 and redirect fluid flow to opening 337 in fluid exit 304. Element 602 of shear decoupler 342 is conical to give the received fluid an angular velocity as it enters the holes 343. Fluid shear decoupler 342 is fixably attached to the bottom of rotor cover plate 317 which, in turn, is attached by means of screws 318 to outer rotor 307. This direct coupling between fluid shear decoupler 342 and outer rotor 307 ensures that the fluid exiting Coriolis rotor 314 initially has the same angular velocity as the Coriolis rotor. Because the exiting fluid is rotating at the same rate as the Coriolis rotor, it cannot exert a torque on the Coriolis rotor due to viscous shear. This isolation of Coriolis rotor 314 from the adverse effects of the viscosity of the exiting fluid improves the accuracy of the mass flow measurement. In some embodiments, opening 337 is the fluid inlet. Shear decoupler 342 performs the same decoupling function in such embodiments.

Figure 7:
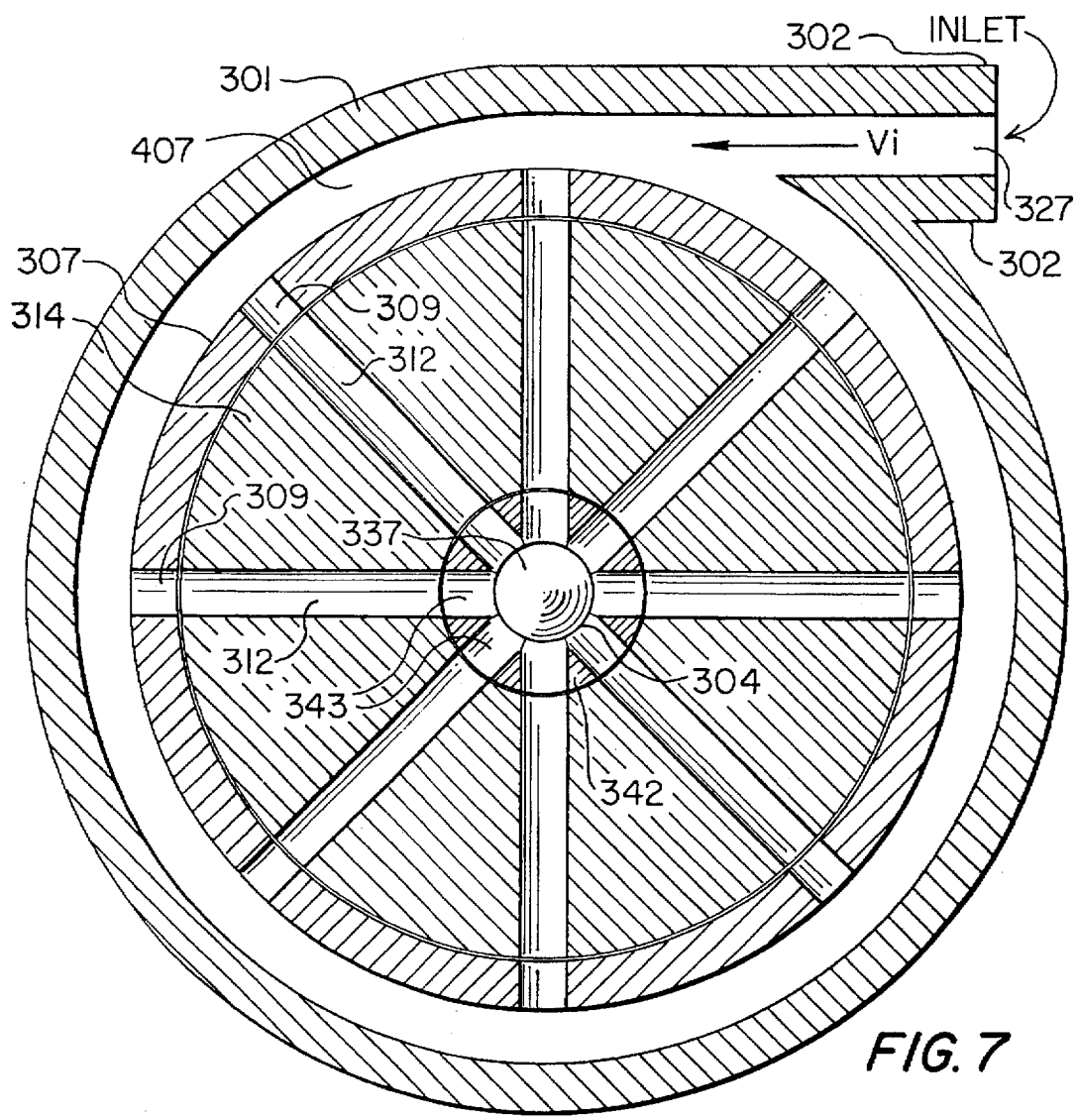
FIG. 7 is a cross-sectional view taken along lines 7—7 of FIG. 6.

FIG. 7 shows further details of the apparatus shown on FIG. 4. Shown on FIG. 7 are fluid containment housing 301, outer rotor 307, and Coriolis rotor 314. Also shown are radial holes 309 in outer rotor 307 and radial holes 312 in Coriolis rotor 314. The area 407 between the inner portion of the fluid containment housing 301, the outer portion of outer rotor 307 receives fluid flow from opening 327 of inlet 302. The received fluid flows counterclockwise in space 407 and enters radial holes 309 in the outer rotor 307, travels through the radial holes 312 in Coriolis rotor 314 and ultimately exits the meter at fluid exit 304. In so doing, Coriolis forces are generated which causes the aforementioned angular displacement between Coriolis rotor 314 and outer rotor 307. The magnitude of this angular displacement is measured by coils 323 and 324 cooperating with magnets 344 and 316 as already described. Fluid shear decoupler 342 rotates in unison with outer rotor 307, it receives the fluid flow in holes 343 from radial holes 312 in the Coriolis rotor 314 and redirects this flow upwards and out of fluid exit 304 and its opening 337.

The angular velocity of the combined rotors can be determined from the law of conservation of angular momentum. The angular momentum of the incoming fluid is:

$$I_i = M_i V_i R_2 \tag{12}$$

where
$I_i$=incoming angular momentum
$M_i$i=mass of incoming fluid
$V_i$=velocity of incoming fluid
$R_2$=outer radius of outer rotor $$\frac{I_i}{M_i} = V_i R_2 \qquad \text{Eq. 13}$$

where
$I_i/M_i$=specific angular momentum of the fluid
The rotor fluid angular momentum in the combined rotors can be determined by integrating over R. The outer and Coriolis rotors are considered a single unit. $R_2$ is the outer rotor outer 307 radius, and $R_1$ is the axial outlet hole radius on fluid shear decoupler 342.

Converting equation 12 to a differential equation, one obtains for the rotor fluid angular momentum:

$$\delta I_R = \delta M_R V_R R \tag{14}$$

where
$I_R$=rotor fluid angular momentum
$M_R$=rotor fluid mass
$V_R$=rotor fluid tangential velocity
From equation 7, one obtains:

$$\delta M = \rho A_h \delta R = \pi r^2 \rho \delta R \tag{15}$$

where
r=radius of radial hole in rotor
ρ=fluid density
Since $V_R$ of equation 14=ωR, substituting this and equation 15 into equation 14 and setting up the integral, one obtains:

$$I_R = \int_{R_1}^{R_2} (\pi r^2 \delta R \rho)(\omega R)(R) \qquad \text{Eq. 16}$$

where
$R_1$=rotor outlet radius
$R_2$=rotor outer radius
$\omega$=rotor angular velocity Rearranging equation 16, one obtains:

$$I_R = \pi r^2 \rho \omega \int_{R_1}^{R_2} R^2 \delta R \qquad \text{Eq. 17}$$

Completing the integration of equation 17, one obtains:

$$I_R = (\pi r^2 \rho \omega) \frac{(R_2^3 - R_1^3)}{3} \qquad \text{Eq. 18}$$

From equation 13, the specific average angular momentum per unit mass of the fluid in the rotor is determined by dividing equation 18 by the fluid mass in the rotor. The fluid mass is the radial hole volume times fluid density. The following expression is then obtained:

$$\frac{I_R}{M_R} = \frac{(\pi r^2 \rho \omega)(R_2^3 - R_1^3)}{3\pi r^2 \rho (R_2 - R_1)} \qquad \text{Eq. 19}$$

Simplifying equation 19 one obtains:

$$\frac{I_R}{M_R} = \frac{\omega(R_2^3 - R_1^3)}{3(R_2 - R_1)} \qquad \text{Eq. 20}$$

If we assume that the outlet port radius, $R_1$, is small (zero) compared to the outer rotor outside radius, $R_2$, equation 20 then becomes:

$$\frac{I_R}{M_R} = \frac{\omega R_2^2}{3} \qquad \text{Eq. 21}$$

From the conservation of angular momentum, the specific angular momentum of the fluid in the rotors, $I_R/M_R$, is equal to the specific angular momentum of the incoming fluid, $I_i/M_i$. One then obtains:

$$\frac{\omega R_2^2}{3} = \frac{V_2 R_2}{3} = V_i R_2 \qquad \text{Eq. 22}$$

from equations 14, 21
where: $V_2 = \omega R_2$, one obtains:

$$V_2 = 3V_i \qquad (23)$$

where
$V_2$=tangential rotor velocity at $R_2$
$V_i$=incoming fluid velocity

These calculations show that the tangential velocity of the periphery of the outer rotor 307 is three times the tangential velocity of the incoming fluid (neglecting drag). Experimental results have shown that even with viscous and bearing drag, the periphery of the rotor has higher velocity than the incoming fluid. The incoming fluid is abruptly accelerated tangentially as it enters the outer rotor. As the fluid continues to travel radially inward, its tangential velocity decreases with radius until, near the rotor axis, its tangential velocity is near zero. The outer rotor 307 experiences drag torque due to the abrupt acceleration Of the fluid, as well as fluid viscous drag, and bearing drag. It also experiences a torque in the direction of rotation due to the tangential (Coriolis) deceleration. The Coriolis rotor 314 is enclosed by the outer rotor and therefore only experiences the Coriolis torque in the direction of rotation. At equilibrium, the Coriolis rotor supplies the drive torque while the outer rotor supplies the equal and opposite drag torque.

The torsion bar axle 329 which connects the Coriolis rotor 314 to the outer rotor 307 allows an angular displacement between them which is proportional to torque. The angular displacement is measured by means of the voltage generated in coils 323 and 324 by magnets 316 and 344. Magnets 316 are fastened to Coriolis rotor 314 and magnets 344 are fastened to rotor cover 317. A sufficiently large number of magnets are used so that the series of voltage peaks are induced in the coils to approximate a sine wave output in each coil.

The periodic wave outputs from coils 323 and 324 are aligned during the flowmeter assembly so that there is no phase angle between them during zero fluid flow. This is done by spinning the rotors via a motor with the flowmeter empty and the bearing cap 336 removed so as to allow a motor to be temporarily connected to the rotor axle. Coil 323 is moved so as to change the phase angle between the periodic wave outputs of coils 323 and 324. With the sine waves aligned (zero phase angle), coil 323 is locked in position. After the meter output is calibrated, it can be shown that the time interval between the passage of the two sine waves is proportional to the mass flow rate and is independent of rotor rpm.

This is shown as follows:

$$\phi = \omega T \qquad (24)$$

where
$\Phi$=angular displacement
$\omega$=angular velocity
$T$=time interval between waves $$\text{but } \phi = \frac{\tau}{K_s} \text{ (torsional spring equation)} \qquad \text{Eq. 25}$$

where
$\tau$=Coriolis torque (eq. 11)
$K_s$=torsional spring constant $$\text{thus } \phi = \omega T = \dot{M}\omega \frac{(R_{c2}^2 - R_{c1}^2)}{K_s} \qquad \text{Eq. 26}$$

from equations 11, 24, 25
Note: $R_{c1}$ and $R_{c2}$ are the inner and outer radii of the inner (Coriolis) rotor.

Thus:

$$T = \frac{\dot{M}(R_{c2}^2 - R_{c1}^2)}{K_s} \qquad \text{Eq. 27}$$

Equation 27 shows that the time interval between magnet crossings is directly proportional to mass flow rate. It is independent of bearing drag, viscous drag, and rpm. Thus this invention overcomes the problems of previous rotary mass flowmeters.

The fact that the mass flow measurement by the apparatus of the present invention is independent of rotor rpm confers another advantage. It allows the fluid channels (the radial holes) in the outer rotor, to be shaped so as to reduce the pressure drop across the meter. Industry tries to minimize pressure drop in fluid systems because it wastes energy. All Coriolis meters create pressure drop in the flowing fluid. The pressure drop in the meter of FIG. 3 results primarily from the fluid having to flow radially inward against the centrifugal force of the spinning rotor. The rotor RPM and the flowmeter pressure drop can be minimized by curving the fluid passages so that their openings face in the direction of rotation at the rotor periphery as shown on FIG. 8.

EMBODIMENT OF FIG. 8

Figure 8:
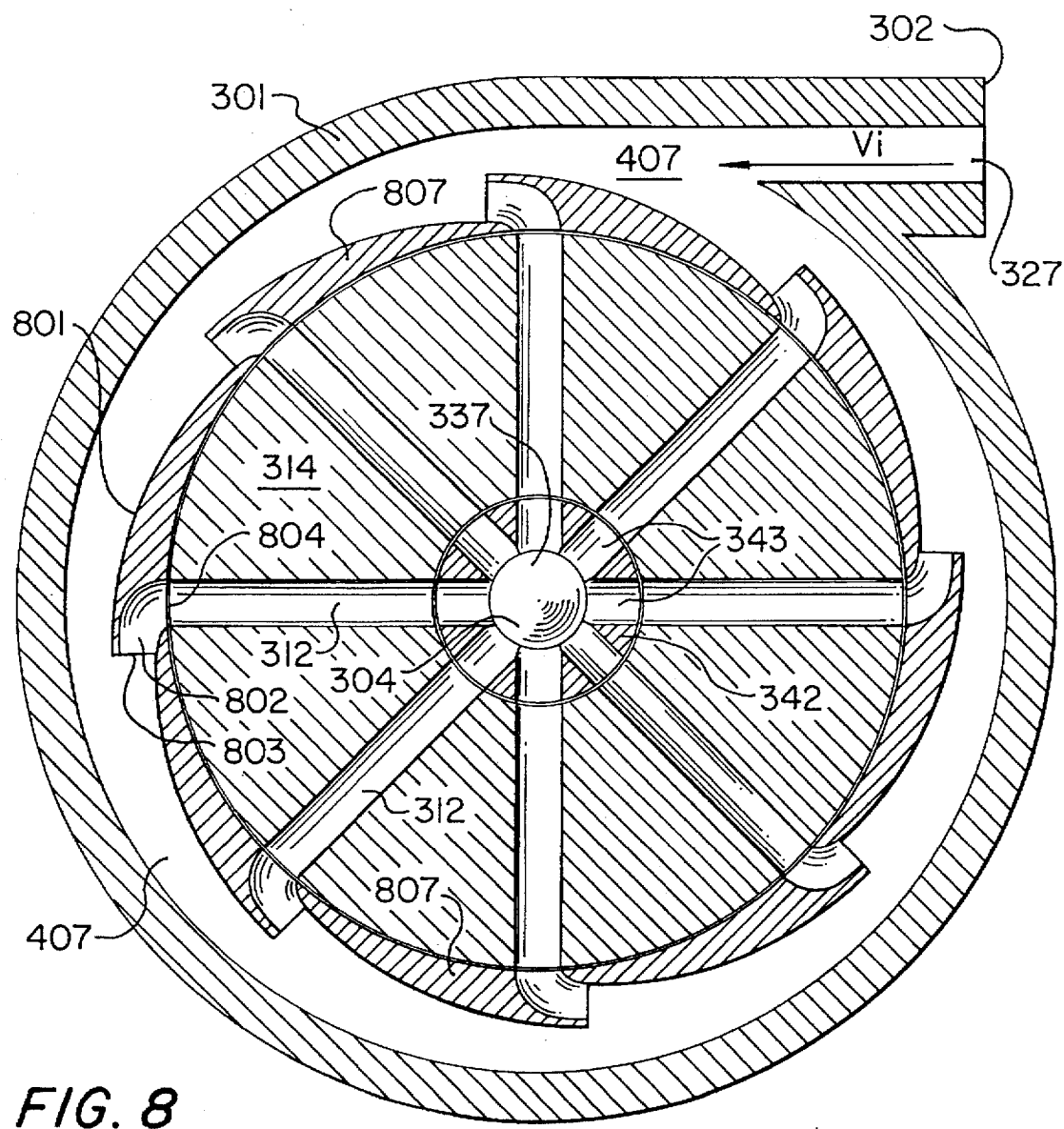
FIG. 8 discloses an alternative embodiment to that of FIG. 3.

FIG. 8 discloses a rotary Coriolis flowmeter similar to that shown on FIG. 3 but having scoops on the outer periphery of the outer rotor for reducing the rotor RPM. This embodiment includes a fluid containment housing 301 having a tangential inlet port 302 whose opening 327 permits fluid to enter inner space 407 of the meter. The flowmeter of FIG. 8 has an outer rotor 807 and a Coriolis rotor 314. Space 407 comprises the area between the inner surface of fluid containment housing 301 and the outer surface of the outer rotor 807 and its cover 303 (not shown on FIG. 8). Outer rotor 807 is comparable to outer rotor 307 of FIG. 3 except that its periphery has a plurality of saw-tooth teeth 801. Coriolis rotor 314 has a plurality of radial holes 312 as does Coriolis rotor 314 of the embodiment of FIG. 3. Holes 309 in outer rotor 307 of the embodiment of FIG. 3 are replaced by right angle elements 802 in outer rotor 807 in the embodiment of FIG. 8. The inner opening 804 of each right angle element 802 is aligned with a mating radial hole 312 in Coriolis rotor 314. The other opening of the right angle element 802 in outer rotor 807 comprises a scoop like opening 803. The inner terminus of each radial hole 312 in Coriolis rotor 314 is aligned with an opening 343 in fluid shear decoupler 342 which serves the same function as does fluid shear decoupler 342 in the embodiment of FIG. 3. Namely, fluid shear decoupler 342 receives the fluid flow from the radial holes 312 and directs it axially upwards so that the fluid leaves the flowmeter through opening 337 of fluid exit 304 without fluid shear being placed on the Coriolis rotor 314.

Equation 23 shows that the speed at the periphery of outer rotor 307 in the embodiment of FIG. 3 is three times that of the velocity of the incoming fluid. In the embodiment of FIG. 8, the speed at the periphery of outer rotor 807 is somewhat greater than the velocity of the incoming fluid. However, the openings 803 of right angle element 802 "scoop-up" the fluid in space 407 as outer rotor 807 spins at a higher velocity than that of the incoming fluid. This forces the incoming fluid into opening 803 of right angle element 802, through outer rotor 807 and, in turn, through radial holes 312 in the Coriolis rotor 314. In so doing, the dynamic energy of the incoming fluid is converted into fluid pressure which reduces the rotation of rotors 807 and 314 to decrease the pressure drop across the flowmeter. The reaction force created by this energy conversion also causes the rotation of the Coriolis and outer rotors to slow and thereby reduce the centrifugal force on the incoming fluid. This, in turn, further decreases the pressure drop within the Coriolis flowmeter of FIG. 8. The embodiment of FIG. 8 is similar in all other respects to that of FIGS. 3-7 including how rotors 807 and 314 are connected to each other and to housing 301 by means of shafts, bearings, etc.

CURVATURE OF ROTOR HOLES—FIG. 9

While the outer rotor holes can be curved or have right angle elements 802, the Coriolis rotor holes 312 cannot because the reaction force due to the hole curvature results in torque on the Coriolis rotor that is proportional to fluid velocity and thus dependent on fluid density. This is undesirable. The velocity dependence can be shown with reference to FIG. 9 by separating the forces of fluid acceleration into two additive components; that due to the spinning of the rotor with straight channels, and that due to the curvature of the channels. The spinning rotor torque component has already been solved (Equation 11). The solution to the curvature component torque is simplified by the realization that any curve, such as element 902, can be reduced to a series of short curve segments of constant radius. The solution to a constant radius curve can therefore be extended to any curve. On FIG. 9, the center of curvature, 901, of a curved piece of flow channel 902 is shown located arbitrarily with respect to the rotor axis, 903. The force on this curved flow section 902 can be calculated from the well known centrifugal force equation which is expressed as:

$$F_{curve} = \frac{MV^2}{r} \qquad \text{Eq. 28}$$

where
M=mass
V=velocity
r=radius of curvature, 907

Figure 9:
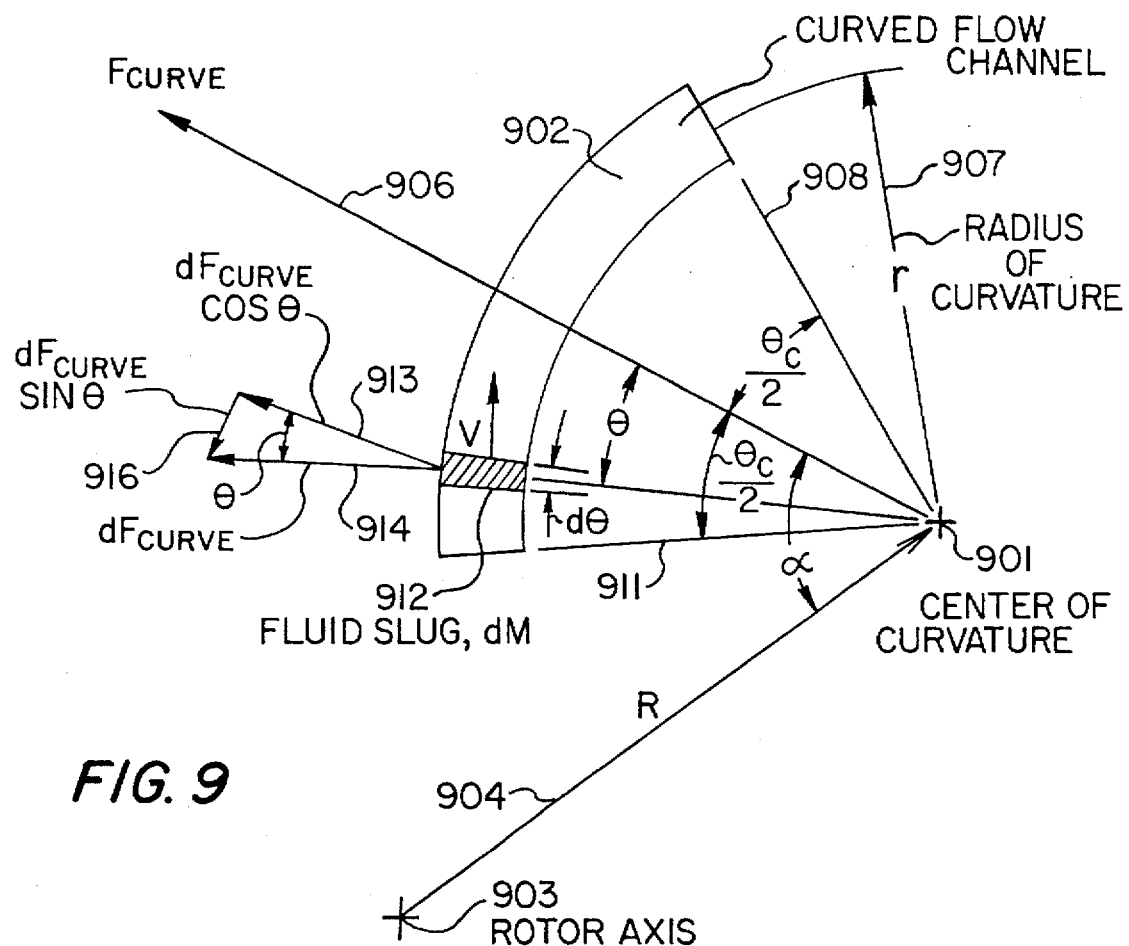
FIG. 9 illustrates forces associated with an outer rotor having non radial holes.

The differential equation for the centrifugal force on the curved flow channel 902 of FIG. 9 is:

$$\delta F_{curve} = \frac{\delta M V^2}{r} \cos\theta \qquad \text{Eq. 29}$$

where
$\delta M$=fluid mass differential
V=fluid velocity
r=radius of curvature

The differential force, $dF_{curve}$ 914 on each differential mass element 912, dM, is in the radial direction to the tube section 902. $\theta$ is the angle between $dF_{curve}$ 914 and the line 906 bisecting the constant radius section of the curved flow channel 902. $dF_{curve}$ 914 is broken down into its perpendicular components, $dF_{curve}\sin\theta$ (916) and $dF_{curve}\cos\theta$ (913). The sine components for positive $\theta$ will cancel the sine components for negative $\theta$ when the forces for the entire curved section are summed. The cosine components of $dF_{curve}$ are all positive and parallel to line 906 and thus additive. Therefore, the equation for the total centrifugal force becomes:

$$F_{curve} = \int_{-\frac{\theta_c}{2}}^{\frac{\theta_c}{2}} \delta M \frac{V^2}{r} \cos\theta \qquad \text{Eq. 30}$$

where
$\theta$=angle between differential force 914 and line 906 bisecting curve 902
$\theta_c$=angular length of curved flow channel $$\text{but } \delta M = \rho A_h r \delta\theta \qquad (31)$$

where
M=$\rho\times$volume
 =$\rho\times A_h\times$length
 =$\rho\times A_h\times r\delta\theta$
$\rho$=fluid density
$A_h$=channel cross section area
$\theta$=angular measure of curve in radians
Therefore, $$\therefore F_{curve} = \int_{-\frac{\theta_c}{2}}^{\frac{\theta_c}{2}} \rho A_h V^2 \cos\theta \, \delta\theta \qquad \text{Eq. 32}$$

Equation 9 expresses M as:

$$\dot{M} = \rho A_h V \qquad (33)$$

Substituting equation 33 into equation 32, one obtains:

$$F_{curve} = \int_{-\frac{\theta_c}{2}}^{\frac{\theta_c}{2}} \dot{M}V\cos\theta\, d\theta \qquad \text{Eq. 34}$$

By integrating equation 34, one obtains:

$$F_{curve} = 2\dot{M}V\sin\frac{\theta_c}{2} \qquad \text{Eq. 35}$$

The torque on the rotor due to the force vector 906, $F_{curve}$, is equal to the cross product of $F_{curve}$ and the vector R (904) joining the rotor axis with the center of curvature.

By taking the vector cross product of these two vectors and substituting equation 35 for $F_{curve}$, one obtains:

$$\tau_{curve} = 2R\dot{M}V\sin\frac{\theta_c}{2}\sin\alpha \qquad \text{Eq. 36}$$

where
R=radial vector 904 from rotor center 907 to curve center 901.
α=angle between vectors 904 and 906

The significant factor in the equation 36 is the fluid velocity term, V. The fact that torque on the rotor is proportional to fluid velocity means that fluids of different density flowing at the same mass flow rate would result in different torque readings and thus different indicated mass flows. This is undesirable. The fluid channels in the Coriolis rotor should have no curvature in the plane of the rotor for the meter to be insensitive to fluid density. However, fluid channels that are curved and that are in a plane that contains the rotor axis do not adversely effect the Coriolis torque that is generated on the rotor. In this case, the centrifugal force vector intersects the rotor axis and does not create a torque on the rotor. In order to produce a torque on the rotor, the centrifugal force vector has to be applied offset to the rotor axis.

Figure 13:
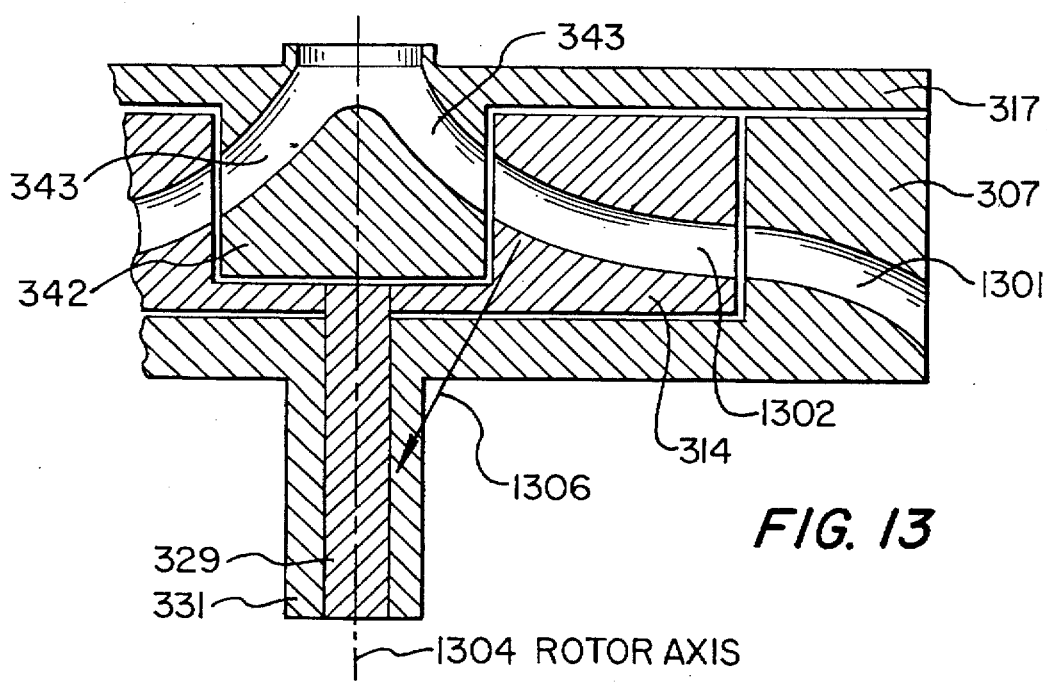
FIG. 13 discloses an embodiment wherein both the Coriolis and outer rotor have non radial holes.

FIG. 13 discloses a curved channel in the Coriolis rotor 314 having a force vector 1306 that is in the same plane as the rotor axis 1304. This being the case, the force vector 1306 due to the channel curvature in hole 1302 has no influence on the rotor rotation. On the other hand, if a radial hole such as 312 in the Coriolis rotor of FIG. 8 were curved such that the curvature were in the plane of the rotor and thus visible in FIG. 8, the resultant force vector would not intersect with the center axis of the Coriolis rotor and would therefore create a resultant torque that would give the Coriolis rotor an angular displacement with respect to the outer rotor.

The holes in outer rotor 307 of the embodiment of FIGS. 3 and 4 need not be radial and may be curved if desired as shown on FIG. 8 in order to decrease the rotor RPM and the pressure drop across the flowmeter. While the curvature in the holes 802 of the outer rotor 807 have an effect on the angular speed of the outer rotor 807, as well as the Coriolis rotor 314, there is no effect on the Coriolis mass flow measurement capability of the flowmeter since it is the rotational time delay of the Coriolis rotor with respect to the outer rotor that is the critical factor. Similarly, factors such as fluid viscosity, bearing drag, and other losses can slow down the angular velocity of both the Coriolis and the outer rotor. However, there is no resultant effect on the Coriolis rotor by itself. The time delay of the Coriolis rotor with respect to the outer rotor remains unchanged and is not influenced by factors such as fluid viscosity, bearing friction, or curvatures in the holes of the outer rotor. In summary, the fluid channels in the outer rotor need not be radial and may be curved, as shown on FIG. 8 to decrease the rotor RPM and meter pressure drop.

JET ROTOR EMBODIMENT—FIG. 10

Figure 10:
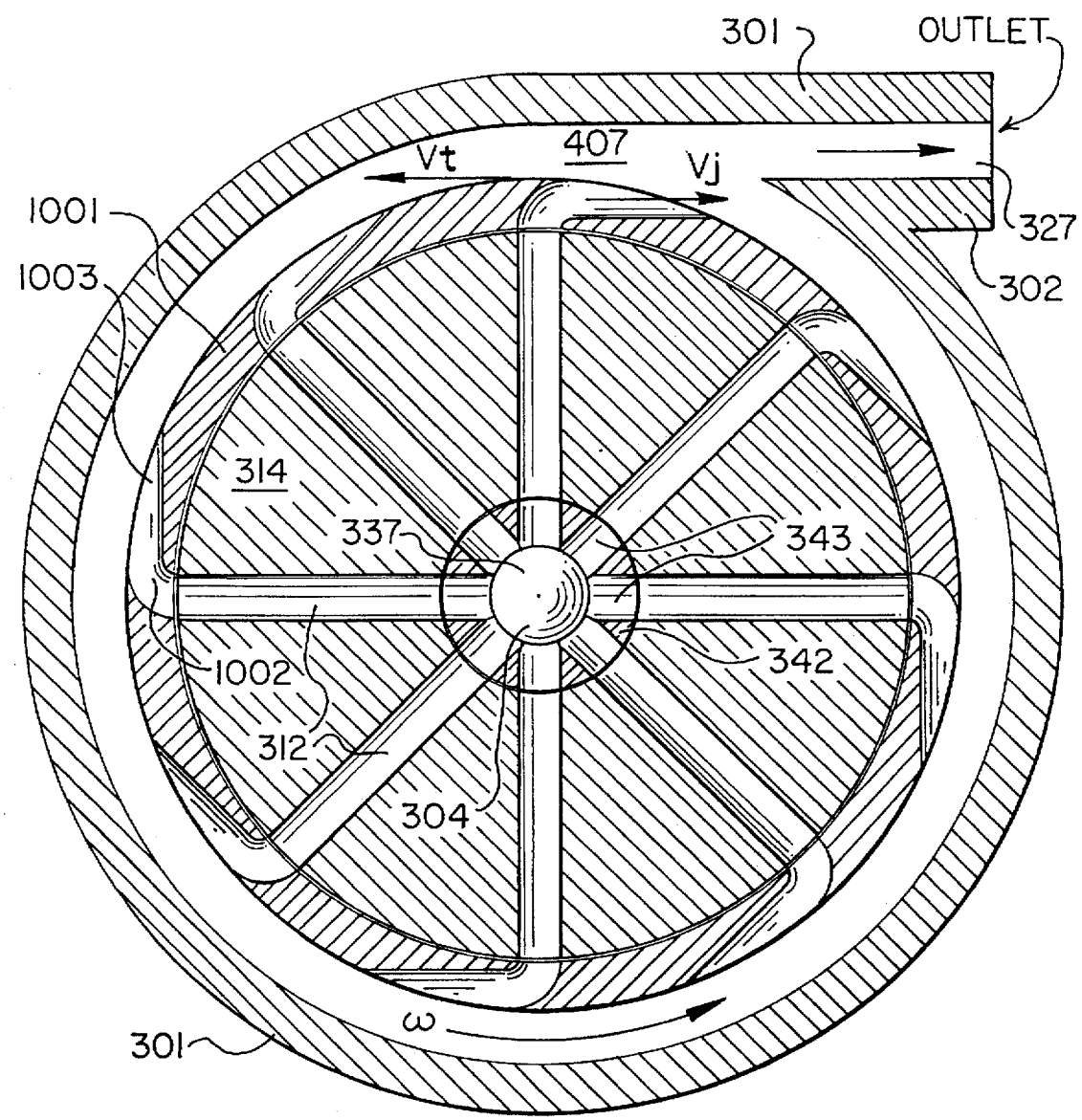
FIG. 10 discloses an alternative embodiment having non radial holes in the outer rotor.

The embodiment of FIG. 10 discloses a Coriolis rotor 314 concentric with an outer rotor 1001 having jet like openings in its outer periphery. In this embodiment, fluid enters the flowmeter at its center through opening 337 of inlet 304 and accelerates tangentially (Coriolis acceleration) as it progresses outwards through radial holes 312 in the spinning Coriolis rotor 314 and through holes 1002 in outer rotor 1001. In outer rotor 1001 the fluid holes 1002 have a 90° turn so that the fluid exits tangentially through jet like openings 1003. The reaction force of the fluid as it makes this 90° turn in holes 1002 causes outer rotor 1001 to spin. Additional rotational speed can be obtained by restricting the area of the jet like openings 1003. This causes the fluid to accelerate and apply additional reaction force to outer rotor 1001. This embodiment of FIG. 10 measures fluid mass flow exactly like the priorly discussed embodiments by measuring the angular offset between the outer and Coriolis rotor.

The equilibrium angular velocity of the Jet powered rotor can be calculated for a frictionless case. The thrust torque is equal and opposite to the Coriolis induced drag torque to define an equilibrium condition. The thrust of the jets 1003 is determined from the change in angular momentum of the fluid as it changes direction and accelerates.

It is well known that:

$$F_j = \rho V_j^2 A_j \qquad (37)$$

where
ρ=fluid density
$F_j$=thrust force of jet
$V_j$=jet fluid velocity change
$A_j$=jet area From equation 4, torque is defined as:

$$\tau = Rf \qquad (37.1)$$

where
F=force
R=distance

Substituting equation 37 into equation 37.1, one gets:

$$\tau_j = \rho V_j^2 A_j R_2 \qquad (38)$$

where
$\tau_j$=drive torque
$R_2$=rotor outer radius=radius to jet

From equation 9:

$$\rho VA = \dot{M} \qquad (39)$$

Substituting equation 39 into equation 38, one obtains:

$$\tau_j = \dot{M}V_j R_2 = \text{jet drive torque} \qquad (40)$$

With the rotor at equilibrium, the Coriolis torque is set equal to the jet drive torque of equation 40.

$$\dot{M}V_j R_2 = \dot{M}\omega(R_2^2 - R_1^2) \qquad (41)$$

Cancel $\dot{M}$ from each side of equation 41 to obtain:

$$V_j R_2 = \omega(R_2^2 - R_1^2) \quad (41.5)$$

If the axial inlet radius, $R_1$, is approximated by zero, then:

$$V_j R_2 = \omega R_2^2 = V_2 R_2 \quad (42)$$

where
$V_2$=rotor tangential velocity
note: $V_2 = \omega R_2$
Then:

$$V_j = V_t \quad (43)$$

where
$V_j$=fluid velocity of jet
$V_t$=tangential velocity of rotor

This shows that for a frictionless system, the outer rotor peripheral velocity is equal and opposite to the jet exit velocity. Thus the fluid is left with zero angular velocity upon exiting the rotor. This makes sense since it entered the rotor with zero angular velocity and the rotor bearings were assumed frictionless. This is in contrast to the embodiment of FIG. 3 where the tangential velocity of the rotor is approximately three times that of the fluid velocity. With respect to the embodiment of FIG. 10, if the fluid velocity of the jet was exactly equal to the tangential velocity of the rotor, the fluid would not exit the opening 327 on the exit port 302. In use, this is not a problem since due to bearing losses and fluid viscosity losses, the tangential velocity $V_t$ of the rotor is smaller than that for the frictionless case and therefore $V_t$ is less than $V_j$. This permits the fluid velocity to move to the right on FIG. 10 and through opening 327 of exit port 302 and out of the flowmeter. The mechanical details of how the embodiment of FIG. 10 is connected to housing 301 is not shown on FIG. 10 since such details are similar to that shown on FIGS. 3–7.

MOTOR ASSIST JET MODE—FIG. 10

The jet rotor embodiment of FIG. 10 has advantages, for some applications, over the previous embodiments because the fluid travels radially outward and thus centrifugal force enhances fluid flow and reduces pressure drop. The primary source of pressure drop in the jet mode embodiment of FIG. 10 is that due to the fluid acceleration in the jets 1003 of outer rotor 1001. The acceleration can be made low with a large jet area. This results in low rotor rpm and low pressure drop at high flow rates. This is good for applications where the flow rate alternates between high flow and zero flow, such as truck loading or custody transfer. Unfortunately, this design results in poor performance at low flow rates.

The low flow rate performance is poor because of the low rotor speed. The rotor speed effects accuracy in two ways. The first is obvious. At very low flows the drag forces become greater than the thrust forces and the rotor stops. No periodic wave output from coils 323 and 324 (FIG. 3) means no flow measurement is possible. The second way that rotor rpm affects accuracy is more subtle. Equation 25 shows that the time delay between periodic waves from coils 323 and 324 is independent of rpm. What degrades at low rpm is the signal to noise ratio.

Noise on the time delay measurement can be either electrical or mechanical in origin. An example of mechanical source noise is the small angular oscillation of the Coriolis rotor that could occur as a result of ambient (pipeline) torsional vibration. The oscillation would result in uncertainty in the rotor phase angle that results from the Coriolis force. Electrical noise on the output signals would also result in additional uncertainty in the phase angle. At low flow rates it can be assumed that the noise is independent of flow rate. The equation for the time delay, from Eq. 24, is shown below taking into account noise.

$$T = \frac{\phi \pm \gamma}{\omega} = \frac{\phi}{\omega} \pm \frac{\gamma}{\omega} \quad \text{Eq. 44}$$

where
T=time delay
$\phi$=phase delay
$\gamma$=phase angle uncertainty
$\omega$=angular velocity The phase delay, $\phi$, is proportional to $\omega$ from equation 11.

$$\phi = \frac{\tau}{K_s} = \frac{M\omega(R_2^2 - R_1^2)}{K_s} \quad \text{Eq. 45}$$

where
$K_s$=torsional spring constant

Substituting equation 45 into equation 44, results in:

$$T = \frac{M\omega(R_2^2 - R_1^2)}{k_s \omega} \pm \frac{\gamma}{\omega} \quad \text{Eq. 46}$$

Cancelling $\omega$, one gets:

$$T = \frac{M(R_2^2 - R_1^2)}{k_s} \pm \frac{\gamma}{\omega} \quad \text{Eq. 47}$$

Note that while the flow induced portion of the time delay, T, is independent of $\omega$, the uncertainty portion of the time delay has $\omega$ in the denominator. Thus, at very low rotor speed, the uncertainty in the time delay (and flow rate) gets very large.

One method of overcoming these inherent low flow problems in the jet mode meter of FIG. 10, is to extend axle 331 (not shown) through fluid containment housing 301 and rotate outer rotor 1001 with a motor in the manner shown on FIG. 17 where motor 1701 is connected to axle 331. Rotor 1001 can then be spun rapidly even at low flow rates and the time delay, T, remains unchanged while signal noise is greatly reduced. At high flow rates, the thrust from the fluid jets provides most of the spinning power and the power required of the motor is low.

Prior art rotary Coriolis flow meters had motor drives and measured torque at the drive motor to determine the Coriolis torque on a single rotor. They were therefore affected by bearing drag, seal drag, and viscous drag on the rotor. These drags produced error in the flow measurement. The present invention, because of its rotor within a rotor design, isolates the Coriolis measuring rotor from the above mentioned sources of drag resulting in a much more accurate meter.

In summary, the jet mode of FIG. 10 with motor assist is a meter that can accurately measure over a wide range of flows. Furthermore, at high flow rates it has low fluid pressure drop and low power consumption.

CURVED HOLE EMBODIMENT OF FIG. 13

FIG. 13 discloses a flowmeter somewhat similar to that shown on FIG. 6 in that it comprises a shear decoupler 342, an outer rotor 307, a Coriolis rotor 314, axle 331 for the outer rotor and torsional axle 329 for Coriolis rotor 314. On FIG. 6, holes 312 in Coriolis rotor 314 and holes 309 in outer rotor 307 are radial. In contrast, on FIG. 13, hole 1302 in Coriolis rotor 314 is curved as is hole 1301 in outer rotor 307. The curvature of holes 1302 and 1301 have no influence on the rotation of the two rotors nor on the angular displacement of Coriolis rotor 314 with respect to outer rotor 307. The reason for this is that any force vector generated by the curvature of hole 1302 such as, for example, force vector 1306 is in the same plane that contains the axis 1304 of the rotor system. Vector 1306 therefore can have no influence on the rotation of the rotor system. By way of distinction, any curvature of hole 312 of Coriolis rotor 314 on FIG. 7 would produce a force vector that is not in the plane of the center axis of the rotor system and therefore, the resulting force vector would have an influence on the rotation of the rotor system of FIG. 7. The apparatus of FIG. 13 is shown only in a skeletonized manner since it is identical to that shown in FIG. 6 except for the curvature of holes 1302 and 1301 in Coriolis rotor 314 and outer rotor 307 respectively.

The details of how outer rotor 307 and Coriolis rotor 314 are connected by shafts and the like to housing are not shown on FIG. 13 since they are similar to that shown on FIGS. 3–7.

AXIAL INLET AND OUTLET—FIGS. 11 AND 12

Figure 11:
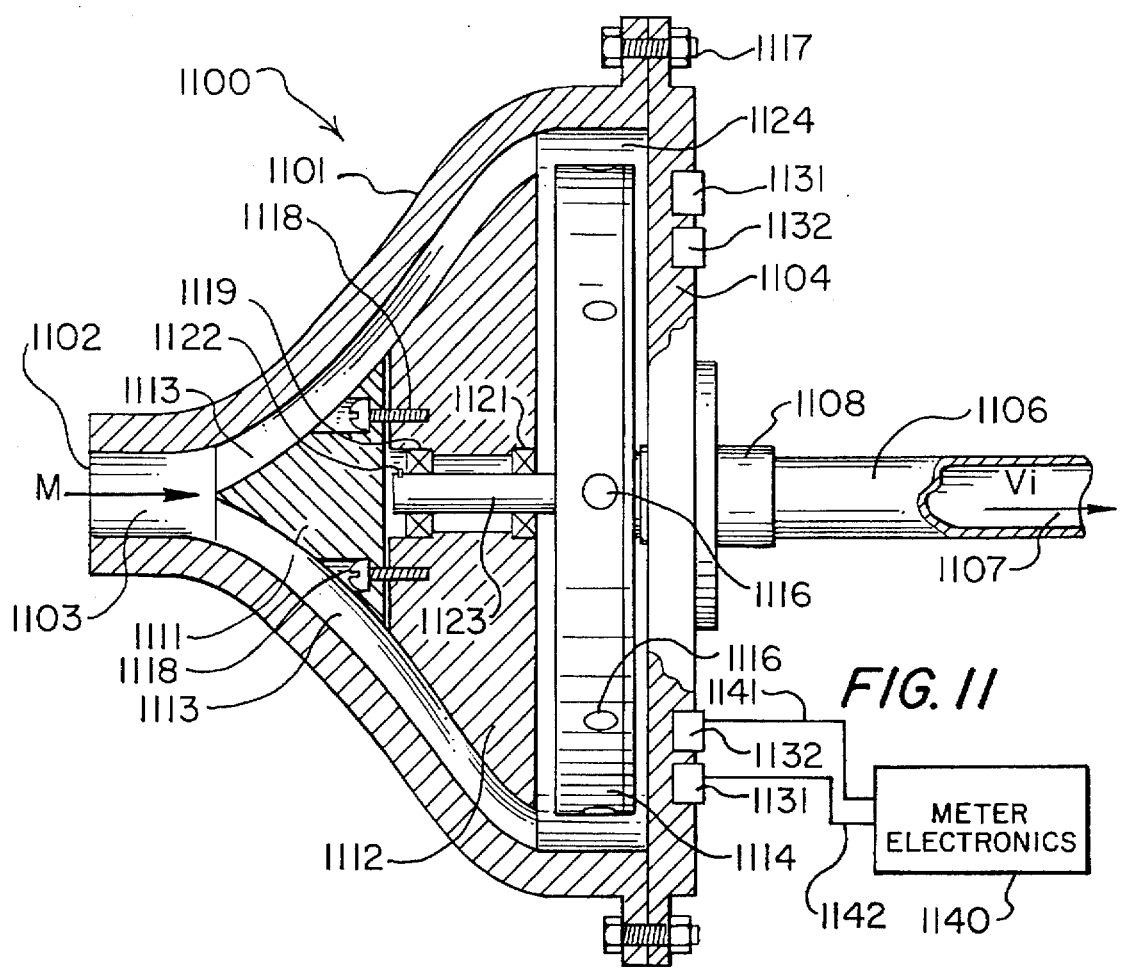
FIGS. 11 and 12 discloses a flowmeter having axial inline inlets and outlets.
Figure 12:
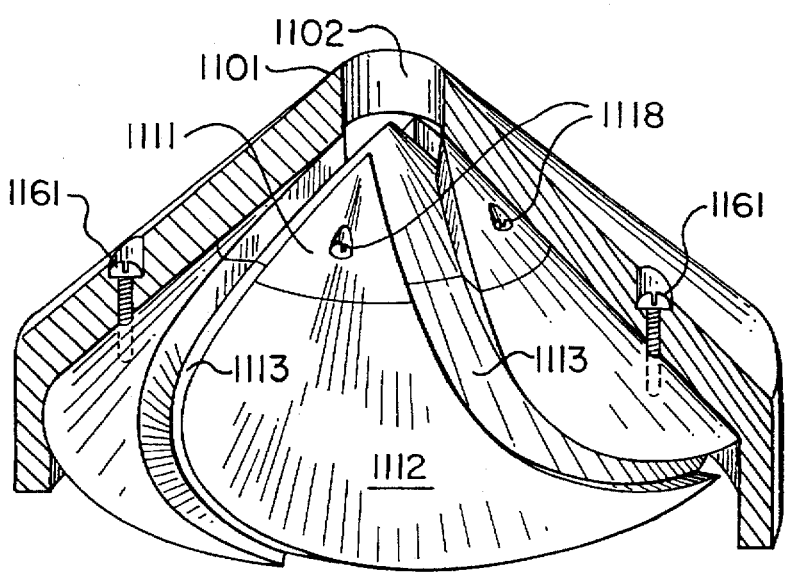

FIGS. 11 and 12 disclose an inline rotary Coriolis mass flowmeter 1100 having a fluid inlet 1102 and a fluid outlet 1106 coaxial with the center axis of the rotor system of the flowmeter. Flowmeter 1100 further includes fluid containment housing 1101 and fluid housing cover 1104 which is fastened to fluid containment housing 1101 by means of screws 1117. The flowmeter elements contained within the fluid containment housing 1101 include an outer rotor 1114 mounted on a central shaft 1123, a Coriolis rotor (not shown) recessed within outer rotor 1114 and having a torsion bar axle (not shown) recessed within axle 1123. Outer rotor 1114 includes a plurality of holes 1116 which cooperate with corresponding holes in the Coriolis rotor. The fluid exit port 1106 is recessed within sleeve 1108 which is fastened to housing cover 1104 by means of screws (not shown). Axle 1123 is retained within element 1112 by means of bearings 1121 and 1119 and circlip 1122 on the left hand of shaft 1123 as shown on FIG. 11.

In use, fluid enters the flowmeter 1100 via opening 1103 and is directed by elements 1111, 1112 and 1113 to the periphery of outer rotor 1114 and its holes 1116. Channels 1113 in elements 1111 and 1112 are curved as shown in FIG. 12 so that the axial fluid flow entering opening 1103 is converted to a tangential flow as it exits channel 1113 and enters fluid chamber 1124 which comprises the space between the outer periphery of outer rotor 1114 and the inner surface of fluid containment housing 1101. By virtue of channels 1113, fluid enters chamber 1124 so that its flow is tangential with respect to the periphery of the outer rotor 1114. This tangential fluid velocity causes the rotor system, including outer rotor 1114, to rotate about its axle 1123. Fluid enters holes 1116 in the same manner as priorly described for the preceding embodiments including the embodiments of FIGS. 3 and 7. Thus, fluid enters holes 1116 of the spinning outer rotor 1114, passes through corresponding holes in the Coriolis rotor (not shown) and exits the flowmeter by means of an element comparable to shear decoupler 342 and 343 of FIG. 3. From there, the fluid flows to the right on FIG. 11 through fluid outlet 1106 and its opening 1107.

Elements 1111 and 1112 contain channels 1113 which convert the axial fluid incoming flow from inlet opening 1103 to a fluid direction that is tangential with respect to the outer periphery of the outer rotor 1114. Element 1111 is affixed to element 1112 by means of the screws 1118. Element 1111 may be detached from element 1112 by screws 1118 when it is desired for maintenance reasons to replace or inspect bearings 1119 and 1121. Screws 1161 on FIG. 12 secure housing 1101 to element 1112.

Coils 1131 and 1132 cooperate with magnets (not shown) in the outer rotor 1114 and Coriolis rotor to generate output signals used by meter electronics 1140 to measure the mass flow rate and other information.

The embodiment of FIGS. 11 and 12 may also be provided with a pin similar to pin 402 (FIG. 4) to limit the angular rotation of the Coriolis rotor with respect to the outer rotor 1114. This pin may extend between the outer rotor and into an opening of the outer rotor 1114 similar to opening 401.

JET POWERED IN-LINE COAXIAL FLOWMETER— FIGS. 14, 15, 16 AND 19

All of the previously discussed embodiments, except for that on FIGS. 11 and 12, disclose a flowmeter having one fluid port in the axial direction and one in the tangential direction. It is often desirable from a cost of installation perspective to have the two fluid ports (inlet/outlet) coaxial. A coaxial embodiment is shown in FIGS. 14, 15, 16, and 19 as having a rotor housing comprising a housing base 1401 and a housing cover 1407 which are bolted together at their flanges 1402 and 1408 by means of bolts or the like extended through holes 1419. Housing cover 1407 has a cylindrical inlet 1404 and opening 1406 which receives fluid from a supply pipe (not shown). Housing base 1401 includes a cylindrical outlet 1403 having an opening 1519 shown on FIG. 15.

Figure 14:
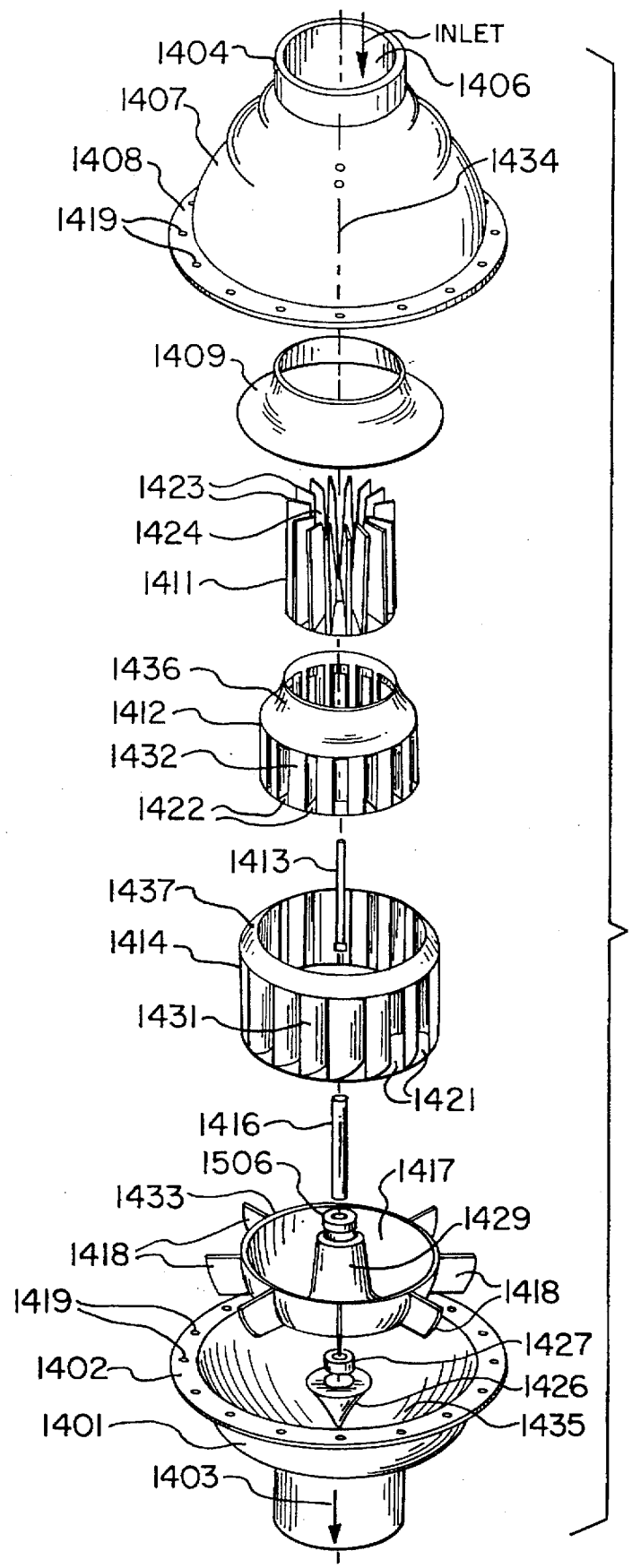
FIGS. 14, 15, and 16 discloses an alternative embodiment having axial inlets and outlets.

The flowmeter of FIG. 14 further includes outer rotor cover 1409, fluid shear decoupler 1411, Coriolis rotor 1412, and outer rotor 1414. In the same manner as for the priorly described embodiments, Coriolis rotor 1412 is coaxial with and fits within a recess of outer rotor 1414. Fluid shear decoupler 1411 is coaxial with and fits within a recess in Coriolis rotor 1412. Fluid shear decoupler 1411 is affixed, as subsequently described, to outer rotor 1414 and rotates about central axis 1434 in unison with outer rotor 1414. The function of fluid shear decoupler 1411 is the same as that for fluid shear decoupler 342 on FIG. 3 in that it receives an axial fluid flow from inlet opening 1406 and converts it to a rotating radial fluid flow that is presented to rectangular holes 1422 in Coriolis rotor 1412. By so doing, fluid shear decoupler 1411 improves the accuracy of the Coriolis measurement by isolating Coriolis rotor 1412 from the torques to which it would be subjected if it received a direct axial fluid flow from inlet opening 1406. Outer rotor cover 1409 serves the same function as does rotor cover 317 on FIG. 3 and is rigidly affixed to outer rotor 1414 and rotates in unison with outer rotor 1414 about common axis 1434.

Coriolis rotor 1412 has fins 1432 and rectangular holes 1422. Outer rotor 1414 has fins 1431 and rectangular holes 1421. Coriolis rotor 1412 is connected to one end of torsional axle 1413 whose other end fits within an opening in axle 1416. One end of axle 1416 is connected to a flat surface of outer rotor 1414. The other end of axle 1416 is connected to bearings in conical element 1426 as subsequently described. Axle 1416 extends through an opening in boss 1429 in bearing housing 1433. Bearing housing 1433 includes a dish-like recess 1417 which has boss 1429 extending from the base of the center of the recess portion as shown on FIG. 14. Bearing housing 1433 has outer fins 1418 which hold bearing housing 1433 within a dish-like recess 1435 of housing base 1401.

In operation, the fluid to be processed is applied to the flowmeter through opening 1406 of inlet 1404 and, in turn, to fluid shear decoupler 1411. Fluid shear decoupler 1411 transforms the received axial flow to a rotating radial flow which is applied to holes 1422 (best seen on FIGS. 14 and 16) of Coriolis rotor 1412. The fluid passes through holes 1422 and then through holes 1421 of outer rotor 1414. Holes 1421 are curved as shown on FIG. 16 and the fluid flow therethrough generates the force that spins the rotors and the fluid shear decoupler 1411 about the axis 1434. The fluid leaving outer rotor 1414 passes fins 1418 of the bearing housing 1433 and exits outlet 1403 of the flowmeter.

Torsional axle 1413 is similar to torsional axle 329 of FIG. 3 in that it permits Coriolis rotor 1412 to be angularly offset from outer rotor 1414 in response to the Coriolis forces generated on Coriolis rotor 1412 as fluid passes through holes 1422 in the rotating Coriolis rotor 1412.

Fluid shear decoupler 1411 includes a plurality of fins 1423 with the space between the fins forming fluid channels 1424. Housing base 1401 and housing cover 1407 are each essentially funnel shaped. The large end of each is sufficiently large so as to leave an annular space between its inner surface and outer rotor 1414. Fluid exits outer rotor 1414 with little angular velocity into the annular space between it and housing base 1401.

The difference between the inline flowmeter embodiments of FIGS. 11 and 12 as compared to FIGS. 14 through 16 and 19 is that the incoming fluid in the embodiments of FIGS. 11 and 12 is given the angular momentum required to spin the outer rotor 1114 before entering the periphery of the outer rotor. The incoming fluid is given angular momentum by channels 1113 formed in the surface of bearing housing 1111 and element 1112. Channels 1113 accomplish this function by their orientation as like a screw thread. In the embodiments of FIGS. 14 through 16 and 19, however, the fluid enters center of the fluid shear decoupler 1411 with no angular momentum. The Coriolis and outer rotors are rotated by the thrust of the exiting fluid upon the outer rotor as the fluid is forced to change directions. The thrust mechanism is the same as that described for the embodiment of FIG. 10.

Figure 15:
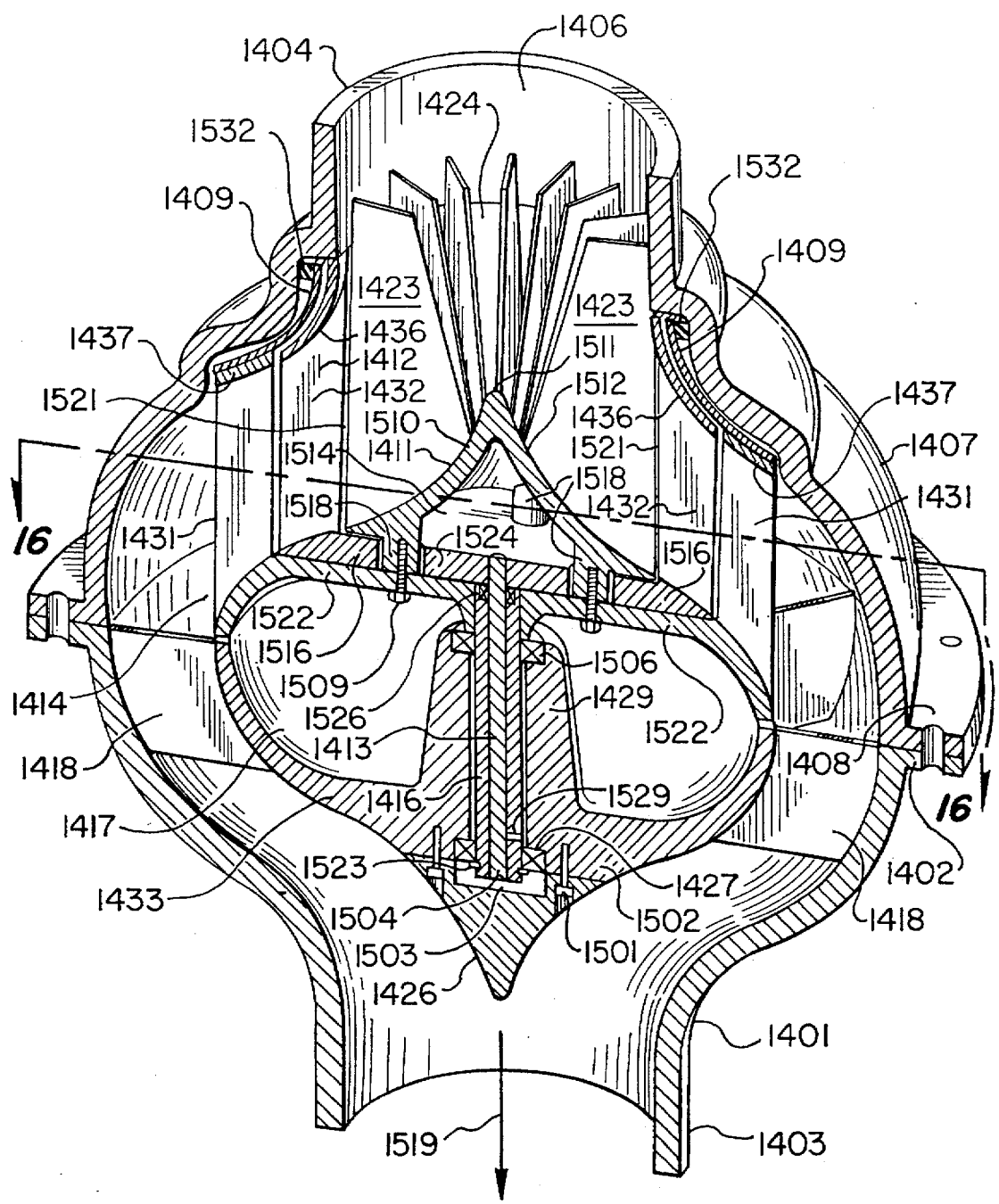
Figure 16:
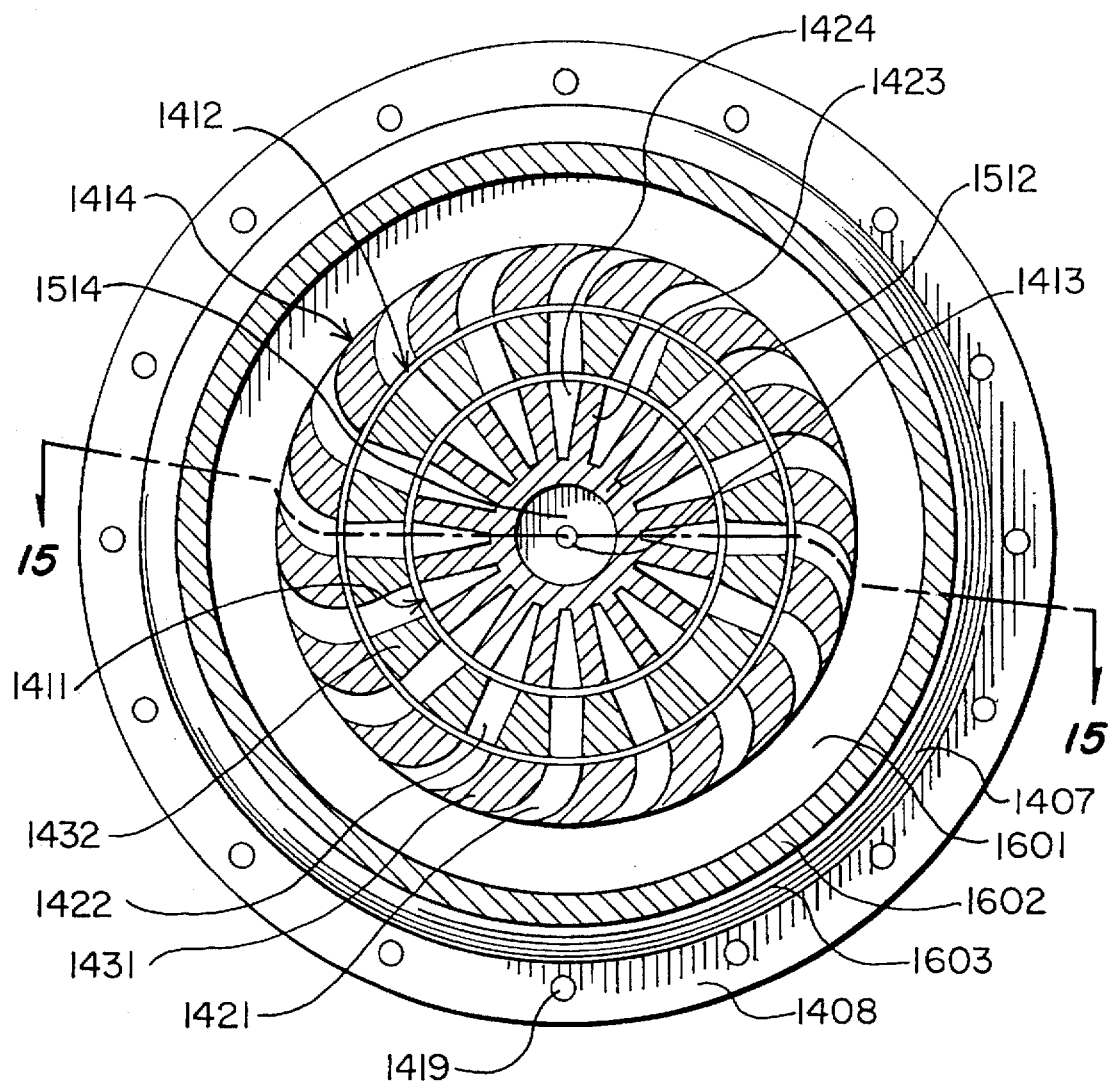
Figure 19:
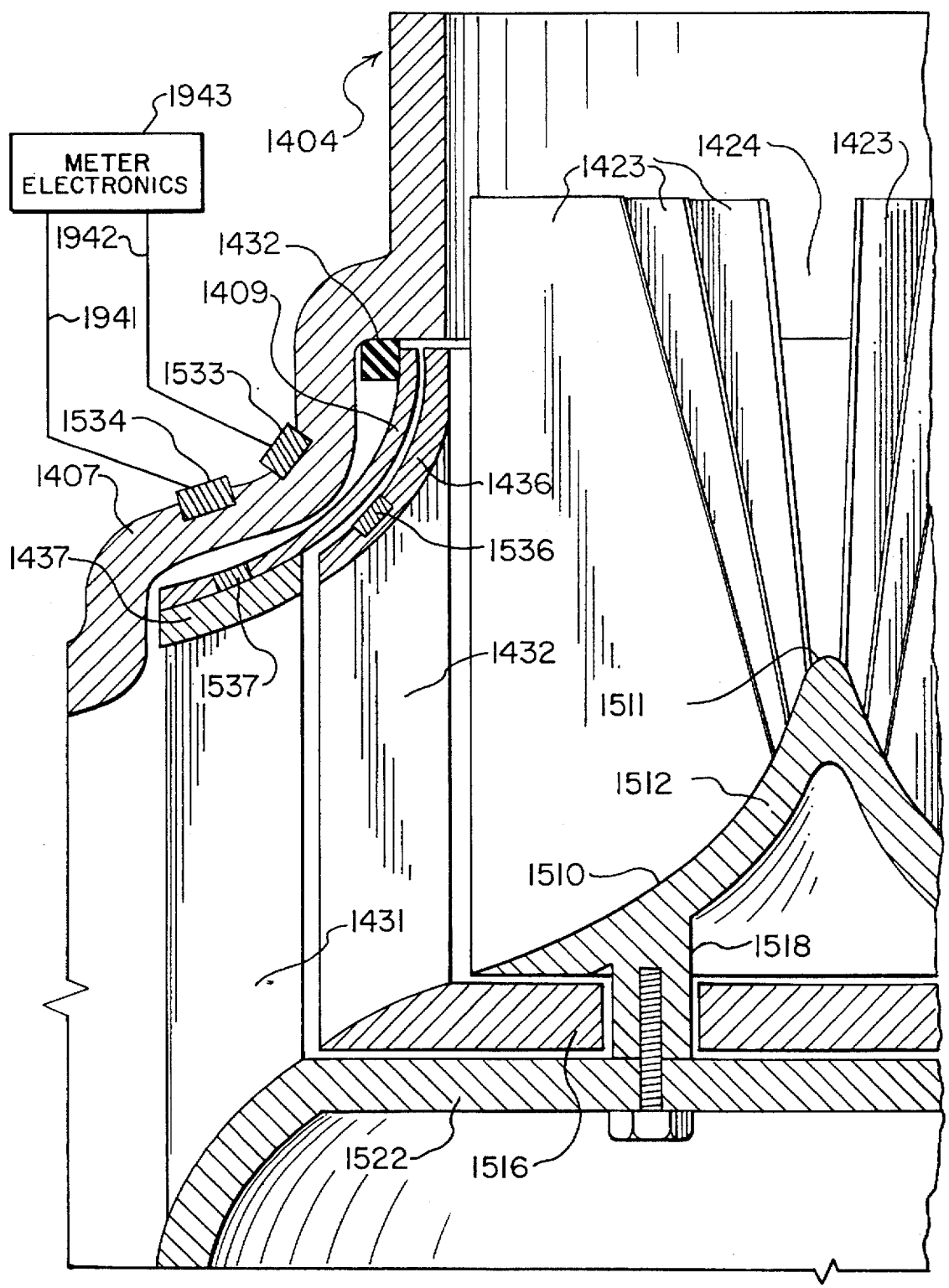
FIG. 19 is an enlargement of a portion of FIG. 15.

FIGS. 15, 16 and 19 together disclose further details of the embodiment of FIG. 14. FIG. 15 comprises a cutaway view taken along the line 15—15 of FIG. 16. FIG. 16 is a cross sectional view taken along line 16—16 of FIG. 15.

Beginning at its center, FIG. 16 discloses the end of torsional axle 1413 surrounded by surface 1514 of Coriolis rotor 1412 which is surrounded by a section of fluid shear decoupler boss 1512. This is positioned within the confines of Coriolis rotor 1412. Fluid shear decoupler 1411, as shown on FIG. 15, comprise the tip or nose 1511 of a conically shaped boss 1512 whose contoured outer surface 1510 on FIG. 15 is attached to edges of fins 1423. The space between fins 1423 comprises channels 1424. As is best seen on FIG. 15, the fluid flow received by channels 1424 is redirected by the contoured surface 1510 (FIG. 16) of boss 1512 from an axial flow to a radial flow as the fluid travels downward on FIG. 15. The fluid is also made to rotate by the fins, 1423, affixed to the rotating conical boss, 1512. This rotating radial fluid flow exits surface 1510 of boss 1512 on FIG. 15 and enters the vicinity of the rectangular holes 1422 in Coriolis rotor 1412 as best shown on FIG. 16.

With reference to FIG. 16, the fluid received by the flowmeter enters channels 1424 of fluid shear decoupler 1411 in an axial direction and is transformed by curved surface 1510 to a radial fluid flow. The radial flow of fluid from channels 1424 of fluid shear decoupler 1411 is applied to the holes 1422 of Coriolis rotor 1412 which comprise the open areas between fins 1432 of Coriolis rotor 1412.

On FIG. 16, the fluid exits holes 1422 in Coriolis rotor 1412 and enters the jet shaped holes 1421 of outer rotor 1414. The jet shaped holes 1421 of outer rotor 1414 comprise the open spaces between fins 1431 of outer rotor 1414. The jet effect of the fluid exiting holes 1421 in outer rotor 1414 generate a propulsion force which causes the rotor to spin counterclockwise as shown on FIG. 16 about its center.

Coriolis rotor 1412, shear decoupler 1411 and the rotor cover 1409 rotate in unison with outer rotor 1414 about the common center axis 1434. However, by virtue of the flexing capability of torsional axle 1413, Coriolis rotor 1412 may assume a rotational offset with respect to outer rotor 1414 due the Coriolis forces generated on spinning Coriolis rotor 1412. The fluid exiting the jet like holes 1421 of outer rotor 1414 enters the open space 1601 shown on FIG. 16.

Since FIG. 16 is a cross-sectional view taken along line 16—16 of FIG. 15, cross hatched element 1602 on FIG. 16 is a cross section of housing cover 1407. Element 1603 comprises a portion of the exterior surface of housing cover 1407. Flange 1408 of housing cover 1407 and its holes 1419 are also shown on FIG. 16.

FIG. 15 shows further details of the embodiment of FIGS. 14 and 16 in partially cut away form. FIG. 15 discloses the opening 1408 of inlet 1404 which receives the fluid to be processed and extends it through channels 1424 of the fluid shear decoupler 1411. In so doing, by means of contoured surface 1510 of boss 1512, the direction of fluid is converted from axial to radial and applied to holes 1422 of the Coriolis rotor 1412.

The lower portion (on FIG. 15) of boss 1512 includes a plurality of legs 1518 whose lower extremities abut a surface portion 1522 of outer rotor 1414. The bolt 1509 in each leg permits fluid shear decoupler 1411 to be rigidly affixed to portion 1522 of outer rotor 1414. Legs 1518 of fluid shear decoupler 1411 extend through openings in the flat surfaces 1516 and 1524 of Coriolis rotor 1412 so that fluid shear decoupler 1411 may be rigidly affixed by its legs 1518 to outer rotor 1414. The holes through the flat surfaces 1516, 1524 of the Coriolis rotor are sufficiently larger than the diameter of the legs 1518 so as to allow limited angular displacement of the Coriolis rotor with respect to the outer rotor and shear decoupler. Except for these openings in the base surfaces 1516 and 1524 of Coriolis rotor 1412, the base of Coriolis rotor 1412 consists essentially of a flat circular disk element (not shown) to which fins 1432 of Coriolis rotor 1412 are affixed. Fins 1432 of Coriolis rotor 1412 extend between the flat base area on their bottom and on their top are connected to the partially conical element 1436 of the Coriolis rotor. The junction of the lower extremity of the conical element 1436 and a fin 1432 of Coriolis rotor 1412 is shown on FIG. 15. On FIG. 15, the lower portion of fins 1432 are shown connected to base surface 1516 of the Coriolis rotor.

Torsional axle 1413 is shown on FIG. 15 with its upper end being affixed rigidly to element 1524 of Coriolis rotor 1412 and with its lower end 1504 being affixed by set screw 1529 to the lower end of axle 1416. Torsional axle 1413 extends through bearing 1526 at the upper end of axle 1416. Axle 1416 is shown rigidly affixed to portion 1522 of outer rotor 1414. Axle 1416 extends through bearing 1506 or boss 1429 and extends downwardly on FIG. 15 and terminates in bearing 1427. The lower extremity of axle 1416 is extended through bearing 1427 and terminates in open area 1503 which comprises an inner portion of the conical element 1426. Conical element 1426 is affixed to element 1433 by means of holes 1501 which receive screws to hold the two elements together. Circlip 1523 holds axle 1416 in place.

The upper portion on FIG. 15 of the housing cover 1407 includes seal 1532 which is positioned between housing cover 1407 and rotor cover 1409 in order to prevent leakage between these two elements. The embodiment of FIGS. 14–16 and 19 also includes coils 1533 and 1534 (shown on FIG. 19) which cooperate with magnets 1536 and 1537 in order to enable the angular offset of the Coriolis rotor 1412 with respect to the outer rotor 1414 to be determined in the same manner as priorly discussed with respect to the embodiment of FIGS. 3–7.

FIG. 19 discloses further details of a portion of the apparatus shown in FIG. 15. In particular, FIG. 19 represents an enlargement of the upper left quadrant of FIG. 15.

Shown on FIG. 19 are fins 1432 and 1431 of Coriolis rotor 1412 and outer rotor 1414 respectively. These fins are shown positioned within housing cover 1407. Outer rotor cover 1409 is shown adjacent the top portions of fins 1431 and 1432 with outer rotor cover 1409 being affixed to element 1437 and the top of fins 1431 so that it rotates in unison with the rotation of outer rotor 1414. Magnet 1536 is shown embedded in the top of Coriolis rotor fin 1432 while magnet 1537 is shown embedded in outer rotor cover 1409. Magnet 1536 cooperates with coil 1533 while magnet 1537 cooperates with coil 1534. Both coils are shown affixed to housing cover 1407. The rotation of these magnets past their respective coils as their respective rotors rotate permits the angular rotation of Coriolis rotor 1412 with respect to outer rotor 1414 to be determined and, in turn, permits the mass flow rate of the material flowing through the flowmeter to be derived. Wires 1941 and 1942 of coils 1534 and 1533 are connected to meter electronics 1943 which operates as does meter electronics 1351 to generate mass flow and other information for the flowing fluid.

Also shown on FIG. 19 are fins 1423 and openings of channels 1424 of the fluid shear decoupler 1411. Further shown on FIG. 19 is the tip 1511 and curved surface 1510 of boss 1512 which comprises the lower portion of the fluid shear decoupler 1411. Further shown on FIG. 19 is element 1522 which is a portion of the outer rotor 1414 and which is shown connected to the lower portion of fin 1431. Also, the lower portion of fin 1432 of Coriolis rotor 1412 is shown connected to base surface 1516 of the Coriolis rotor.

MOTOR DRIVEN JET PUMP/FLOWMETER—FIGS. 17 AND 18

FIGS. 17 and 18 disclose a motor driven embodiment of the invention which performs the dual function of a pump and a Coriolis flowmeter for measuring the mass flow rate of the fluid output of the pump. This embodiment is similar, in some respects, to the embodiment of FIG. 10 as well as to the embodiment of FIGS. 3, 4, 5, 6, and 7. FIGS. 17 and 18 are marked with reference numbers identical to the apparatus previously described on other figures that performs a similar function to the elements so numbered on FIGS. 17 and 18.

The apparatus of FIGS. 17 and 18 comprises a fluid containment housing 301 having an outer rotor 307 positioned within a recess of the fluid containment housing and a Coriolis rotor 314 positioned within a recess in the outer rotor in the same manner as shown for the embodiment of FIG. 3. A fluid shear decoupler 342 having holes 343 in a center recess of the Coriolis rotor, but attached in the manner shown on FIG. 3 to a outer rotor cover plate (not shown on FIGS. 17 and 18) so as to rotate in unison with outer rotor 307. The shear decoupler 342 includes holes 343 in the same manner as shown on FIG. 3. The purpose of shear decoupler 342 is to receive fluid having an axial flow through opening 337 and transform this axial fluid flow into rotating radial fluid flow that is applied to radial holes 312 of Coriolis rotor 314. The Coriolis rotor is relatively narrow in width in the embodiment of FIG. 18 as to compared to the prior embodiments while the width of the outer rotor 307 is relatively wide compared to the previously discussed embodiments.

The fluid inlet in the embodiment of FIG. 18 is similar to the embodiment of FIG. 10 in that the received fluid is applied to the opening 337 of fluid inlet 304 and exits the fluid containment housing via opening 302 of opening 327.

FIG. 17 is somewhat similar to FIG. 6 in that it shows the details of how the torsional axle 329 connected to the Coriolis rotor and how the axle 331 connected to the outer rotor 307 are connected to the various elements of the flowmeter fluid containment housing in the same manner as priorly described for FIG. 6. FIG. 17 shows motor 1701 connected to axle 331 which, in the same manner as shown on FIG. 6, is connected to outer rotor 307. Torsional axle 329 serving Coriolis rotor 314 in the same manner as shown on FIG. 6 is recessed within the center of axle 331 and is rigidly affixed on its left hand end, as shown on FIG. 17, to axle 331 by means of set screw 332. Thrust bearing 334 and circlip 339 retain outer axle 331 within the fluid containment housing 301 and its bearing cap 336.

Motor 1701 provides the necessary torque to rotate the rotor system counterclockwise as shown on FIG. 18. Holes 309 in outer rotor 307 are curved in the manner shown on FIG. 18 so as to improve the efficiency of outer rotor 307 as a fluid pump when the rotor system is rotated counterclockwise by motor 1701. Holes 312 in Coriolis rotor 314 are radial in the same manner as shown for the prior embodiments so as to increase the efficiency of the Coriolis motion detection by Coriolis rotor 314 as the rotor system spins clockwise in FIG. 18 under the influence of motor 1701. The inner terminus of holes 312 of the Coriolis rotor are connected to holes 343 in the fluid shear decoupler 342 which, in the same manner as priorly described, isolates holes 312 of Coriolis rotor 314 from the axial fluid flow received by the flowmeter via opening 337 of fluid inlet 304.

The rotation of the rotor system about axle 331 by motor 1701 causes the fluid received by inlet 304 to pass through holes 343 in the shear decoupler 342, through radial holes 312 in the Coriolis rotor 314 to holes 309 of the outer rotor 307. The rotation of outer rotor 307 and the curvature of its holes 309 provides an efficient pumping of the received fluid which exits the flowmeter via opening 302 of fluid exit 327. The flow of the fluid outward from the center portion of the Coriolis flowmeter through its holes 312 to outer rotor 307 causes each elemental portion of the fluid in radial holes 312 to assume an increasing tangular velocity as it flows outwards further from the center of the flowmeter. As priorly described in connection with FIGS. 1 and 2, this tangential acceleration exerts clockwise force on the Coriolis rotor and the walls of its holes 312. The walls of holes 312 provide the force to the fluid necessary to impart to it the increased tangential velocity. This force on the walls of holes 343 causes the Coriolis rotor 314 to lag the rotation of the outer rotor 307 and, in so doing, to assume a clockwise angular displacement from the outer rotor 307. This angular displacement of the Coriolis rotor 314 is permitted by the flexing capabilities of the torsional axle 329.

In the same manner as shown on FIGS. 3, 4, 5, and 6, the apparatus of FIGS. 17 and 18 is provided with magnets (not shown) embedded in the Coriolis rotor 314 and outer rotor 307 and cooperating coils comparable to coils 323 and 324 of FIG. 3. These elements cooperate in the manner priorly described to detect the amount by which the Coriolis rotor 314 is angularly offset with respect to the outer rotor 307. This angular offset is indicative of the mass flow rate of the material delivered by the pump of FIGS. 17 and 18 to an external pipeline or the like (regarding the not shown). The mass flow rate is derived by meter electronics in response to the signals applied to it from coils 323 and 324—Stop pin 402 and opening 401 limit the angular offset of the Coriolis rotor 314 with respect to outer rotor 307.

CHANGING FLOWRATES

The previous calculations have all been done under the assumption of equilibrium conditions. These conditions exist when the flow rate is constant and the rotor has had time to come up to speed. During transient conditions torque is required to accelerate and decelerate the rotors. This torque results in erroneous indicated flow rates, although over the course of a batch involving both acceleration and deceleration, the errors cancel.

In jet driven embodiment, the outer rotor drives the Coriolis rotor by way of the torsion bar. Since the fluid is going radially outward, the Coriolis rotor lags the outer rotor. When the rotor rpm is increasing (either due to increasing motor speed or increasing flow rate) the Coriolis rotor lags still further due to its rotational inertia. The indicated flow rate thus reads high. When the rotor rpm is decreasing, the inertial torque tends to negate the Coriolis torque and thus the meter reads low. It can be shown that if the start and finish rpm are the same, the errors due to acceleration and deceleration cancel each other. This means that standing start-stop batches are accurate and that errors due to changing speeds do not accumulate during long runs.

In the other embodiment in which the fluid goes radially inward, the fluid drives the Coriolis rotor via Coriolis force. The Coriolis rotor leads the outer rotor during steady flow. Increasing flow (and rpm) results in the net torque out of the Coriolis rotor being decreased by the torque necessary to accelerate it. Thus the meter reads low. Decreasing flow likewise results in the meter reading high. As in the other embodiments, the errors cancel each other over the course of a batch. The extremely high accelerations that can result from rapidly opening or closing a valve could overstress the torsion bar and damage the meter. To protect the torsion bar from extreme torques, stops are built into the rotors which limit the angular displacement between them. Such a stop can consist of a cylindrical pin affixed to one rotor which extends into a circumferential slot in the other rotor (FIG. 5) or it can consist of the mounting legs of the shear decoupler extending through oversize holes in the Coriolis rotor (FIG. 19). The slot length is determined so as to allow sufficient movement for the maximum anticipated flow rate but not enough movement to overstress the torsion bar.

It is expressly understood that the claimed invention is not to be limited to the description of the preferred embodiment but encompasses other modifications and alterations within the scope and spirit of the inventive concept. Thus, the term fluid has been used in this description regarding the material flowing through the flowmeter described herein as well as the pump described herein. This term is merely illustrative of the material that may be processed by the apparatus of the current invention. It is to be understood that the apparatus of the present invention may accommodate not only fluids per se but any other material that may flow or be pumped by the disclosed apparatus. Such other materials may include air, gases, slurries, and liquids, as well as fluids. Also, the term "hole" as used herein encompasses opening so any cross sectional configuration, such as round, rectangular, triangular, or other possible configuration including irregular.

Also, optical detection devices, eddy current or other suitable devices could be used in place of magnets and coils as phase measuring devices.

We claim:

1. A Coriolis flowmeter comprising:
   a fluid containment housing;
   a rotor positioned within said housing and having a center axis of rotation,
   Coriolis detection means having a center of rotation coaxial with said center axis of rotation;
   a plurality of fluid paths in said Coriolis detection means with each of said fluid paths extending from an outer periphery of said Coriolis detection means to a center area of said Coriolis detection means;
   a plurality of fluid paths with each of said fluid paths in said rotor extending from the outer periphery of said rotor to an inner periphery of said rotor with at least some of said fluid paths in said rotor being substantially aligned with at least some of said plurality of said fluid paths in said Coddle detection means;
   a fluid inlet for applying received fluid to the interior of said fluid containment housing;
   a fluid outlet for discharging fluid from said fluid containment housing;
   means including said housing and said rotor and said Coriolis detection means responsive to a receipt of fluid by said fluid inlet for extending said fluid through said fluid paths of said rotor and said Coriolis detection means to said fluid outlet;
   means including said means for extending for rotating both said rotor and said Coriolis detection means about said center axis of rotation using energy derived from said fluid while said fluid is extended through said fluid paths of said rotor and said Coriolis detection means;
   means responsive to Coriolis forces generated by said fluid extension and to said rotation of said rotor and said Coriolis detection means for causing said Coriolis detection means to assume an angular offset from said rotor about said center axis of rotation;
   means for providing output signals indicative of the magnitude of said angular offset; and
   means for receiving said signals to derive the mass flow rate of said fluid.

2. A Coriolis flowmeter comprising:
   a fluid containment housing;
   an outer rotor positioned within said housing and having a center axis of rotation,
   a recess in said outer rotor coaxial with said center axis of rotation;
   a Coriolis rotor at least a part of which is positioned in said recess and having a center of rotation coaxial with said center axis of rotation;
   a plurality of openings in said Coriolis rotor with each of said openings extending from an outer periphery of said Coriolis rotor to a center recess of said Coriolis rotor;
   a plurality of openings in said outer rotor with each of said openings extending from the outer periphery of said outer rotor to said recess of said outer rotor with at least some of said openings in said outer rotor being substantially aligned with corresponding ones of said plurality of said openings in said Coriolis rotor;
   a fluid inlet for applying received fluid to an inner chamber of said housing;
   a fluid outlet for discharging said fluid from said housing;
   means including said housing and said outer rotor and Coriolis rotor responsive to a receipt of said fluid by said fluid inlet for extending said fluid through said openings of both said outer rotor and said Coriolis rotor to said fluid outlet;
   means including said means for extending for rotating both said outer rotor and said Coriolis rotor about said center axis of rotation using energy derived from said fluid while said fluid is extended through said openings in said Coriolis rotor and in said outer rotor;

said means for rotating comprising means for causing said outer rotor and said Coriolis rotor to rotate in response to said extension of said fluid;

means responsive to Coriolis forces generated by said fluid extension and to a concurrent rotation of said outer rotor and said Coriolis rotor for causing said Coriolis rotor to assume an angular offset from said outer rotor about said center axis of rotation;

means for generating output signals indicative of the magnitude of said angular offset; and means for receiving said output signals to derive the mass flow rate of said fluid.

3. The Coriolis flowmeter of claim 2 wherein said means for causing further comprises a motor.

4. The Coriolis flowmeter of claim 2 wherein:

said extension of said fluid through said openings of said outer rotor and said Coriolis rotor cause said outer rotor and said Coriolis rotor to rotate about said center axis so that the tangential velocity of the outer periphery of said outer rotor is substantially greater than the tangential velocity of said fluid at said outer periphery of said outer rotor.

5. The Coriolis flowmeter of claim 2 wherein:

said openings in said outer rotor comprise radial holes;

said outer rotor is positioned within a circular recess in said fluid containment housing;

said Coriolis rotor is positioned within a circular recess of said outer rotor;

said outer rotor rotates about said center axis of rotation at approximately three times the velocity of said received fluid.

6. The Coriolis flowmeter of claim 2 wherein said means for generating output signals comprises:

coils positioned on said fluid containment housing;

magnets positioned on said Coriolis rotor and on a cover plate of said outer rotor;

said coils and said magnets being effective upon the angular offset of said Coriolis rotor for generating periodic output signals having a phase difference indicative of the angular offset of said Coriolis rotor with respect to said outer rotor.

7. The Coriolis flowmeter of claim 6 wherein:

said coils comprise a fixed coil and a movable coil;

said magnets comprise a first set of magnets integral with a cover plate of said outer rotor;

said magnets further comprise a second set of magnets integral with said Coriolis rotor.

8. The Coriolis flowmeter of claim 2 wherein said flowmeter further comprises means for limiting the amount by which said Coriolis rotor can be angularly offset with respect to said outer rotor.

9. The Coriolis flowmeter of claim 8 wherein said means for limiting comprises:

a recess in said Coriolis rotor;

limit pin means having a first end positioned within said outer rotor and having a second end extending into said recess of said Coriolis rotor;

the cross-sectional area of said recess being effective to limit the lateral movement of said limit pin means in said recess and, in turn, limit the angular rotation of said Coriolis rotor with respect to said outer rotor.

10. The Coriolis flowmeter of claim 8 wherein said means for limiting comprising a first means on said Coriolis rotor and a second means on said outer rotor operatively connected to limit said angular rotation of said Coriolis rotor relative to said outer rotor.

11. The Coriolis flowmeter of claim 2 wherein said openings in said Coriolis rotor are radial when viewed from a position on said axis of rotation.

12. The Coriolis flowmeter of claim 2 wherein said openings in said Coriolis rotor as well as in said outer rotor are radial.

13. The Coriolis flowmeter of claim 2 wherein said openings in said Coriolis rotor are radial while said openings in said outer rotor are offset from radial.

14. The Coriolis flowmeter of claim 2 wherein each of said openings in said outer rotor include:

a right angle element having a first and a second opening disposed substantially 90 degrees with respect to each other;

said first opening being substantially flush with an inner circumferential surface defining an inner periphery of said recess of said outer rotor;

said second opening being oriented substantially perpendicular to the outer periphery of said outer rotor and facing away from the direction of tangential fluid flow proximate the said outer periphery of said outer rotor.

15. The Coriolis flowmeter of claim 14 wherein:

said fluid flow through said openings of said outer rotor and said Coriolis rotor cause said outer rotor and said Coriolis rotor to rotate about said center axis so that the tangential velocity of the outer periphery of said outer rotor is substantially greater than the tangential velocity of said fluid at said outer periphery of said outer rotor;

said second opening of each of said right angle elements being effective to scoop said fluid at said outer periphery of said outer rotor into the interior of said right angle element of each opening and through said openings of said Coriolis rotor and out of said fluid outlet of said flowmeter;

said right angle elements being effective to reduce the angular rotational velocity of said outer rotor to reduce the pressure drop of said fluid across said meter.

16. The Coriolis flowmeter of claim 2 wherein said openings in said outer rotor each include;

a first opening positioned substantially flush with an inner circumferential surface defining the inner extremity of said recess of said outer rotor;

a second opening substantially flush with said outer periphery of said outer rotor and curved with respect to said first opening to define a jet-like opening for each said hole in said outer periphery of said outer rotor; and said second opening being effective to accelerate the flow of said fluid out of said flowmeter via said fluid outlet.

17. The Coriolis flowmeter of claim 16 wherein said flowmeter further comprises:

a motor connected to said outer rotor for rotating both said outer rotor and said Coriolis rotor about said axis of rotation at an increased rotational velocity with respect to the rotational velocity caused by said fluid flow;

both said outer rotor and said Coriolis rotor being responsive to said increased rotational velocity for increasing the pressure of said fluid in said openings and, in turn, the throughput of said fluid through said flowmeter.

18. The Coriolis flowmeter of claim 16 wherein said means for rotating comprises:

a motor for rotating said outer rotor and said Coriolis rotor about said center axis of rotation;

said openings in said outer rotor being responsive to said receipt of said fluids and said rotation of said Coriolis rotor and said outer rotor to effect a pumping action that pumps said fluid in said openings in said outer rotor to said fluid outlet;

said means for receiving being effective to generate information regarding the mass flow rate of material pumped by said outer rotor.

19. The Coriolis flowmeter of claim 18 wherein:

said openings in said outer rotor are curved so as to decrease the velocity of the fluid exiting said outer rotor and said Coriolis rotor to enhance the pumping of fluid through said outer rotor to said fluid outlet.

20. The Coriolis flowmeter of claim 19 wherein:

said fluid inlet is coaxial with said center axis of rotation; and said fluid outlet is tangential to said housing for the reception of said fluid pumped by said outer rotor and applied to said fluid outlet from openings of said openings in the periphery of said outer rotor.

21. The Coriolis flowmeter of claim 2 wherein:

said fluid inlet directs the flow of said received fluid into said fluid containment housing tangential to the outer periphery of said outer rotor; and said fluid outlet is coaxial with said center axis of rotation of said outer rotor.

22. The Coriolis flowmeter of claim 2 wherein:

said fluid inlet is coaxial with said center axis of rotation; and said fluid flows from said fluid containment housing tangential to said outer periphery of said outer rotor.

23. The Coriolis flowmeter of claim 2 wherein:

both said fluid inlet and said fluid outlet are positioned coaxial with said center axis of rotation of said outer rotor; and said Coriolis flowmeter further comprises means for receiving an axial flow of said fluid from said fluid inlet and for redirecting the flow of said received fluid to provide a fluid flow tangential to said outer periphery of said outer rotor.

24. The Coriolis flowmeter of claim 2 wherein:

both said fluid inlet and said fluid outlet are positioned coaxial with said center axis of rotation of said outer rotor; and said Coriolis flowmeter further comprises means for receiving an axial flow of said received fluid from said fluid inlet and for directing the flow of said received fluid through holes in said Coriolis rotor and said outer rotor to provide an axial fluid flow to said fluid outlet.

25. The Coriolis flowmeter of claim 2 wherein said flowmeter further comprises:

a first axle connecting a center of said outer rotor to said fluid containment housing to allow said outer rotor to rotate about said center axis of rotation;

a longitudinal recess in said axle;

a torsion bar axle fixably connected at one end to a center of said Coriolis rotor and positioned at its other end within said longitudinal recess in said first axle;

means fixably connecting said other end of said torsion bar axle to said first axle;

said Coriolis rotor being responsive to Coriolis forces on said Coriolis rotor due to the rotation of both of said rotors as fluid flows through said openings in said rotors for rotating said Coriolis rotor with respect to said outer rotor with said angular rotation being controlled by the torsional characteristics of said torsion bar axle.

26. The Coriolis flowmeter of claim 2 wherein said outer rotor comprises a disc like end element connected at its periphery to one side of a ring element containing said openings of said outer rotor and wherein said flowmeter further comprises:

a circular outer rotor cover plate removably affixed to a second side of said ring element to seal said recess in said outer rotor;

an opening in said outer rotor cover plate for connecting to said fluid outlet;

a fluid shear decoupler connected to an inner surface of said cover plate proximate said opening in said cover plate for decoupling the rotational velocity of said fluid in said openings in said Coriolis rotor from a shear effect caused by the non rotational state of fluid in said fluid outlet of said flowmeter.

27. The Coriolis flowmeter of claim 26 wherein said fluid decoupler comprises:

a substantially circular element having a center opening;

said substantially circular element being affixed to said inner surface of said cover plate so that said center opening of said substantially circular element is aligned with said center opening of said cover plate;

a plurality of openings in the outer periphery of said substantially circular element each being aligned with one of said openings in said Coriolis rotor;

each of said openings in said outer periphery of said substantially circular element being connected by one of a plurality of curved channels to said center opening of said substantially circular element to convert the motion of said fluid from a rotating radial state to an axial state to decouple said Coriolis rotor from the shear effects of said fluid.

28. The Coriolis flowmeter of claim 2 wherein:

both said fluid inlet and said fluid outlet are positioned coaxial with said center axis of rotation of said outer rotor;

said Coriolis flowmeter further comprising:

a conical element having an apex positioned adjacent said fluid inlet;

a plurality of spiral channels on the periphery of said conical element extending from said tip of said conical element to the opposite end of said conical element positioned adjacent the outer periphery of said outer rotor;

said conical element and said channels being effective for receiving an axial flow of said fluid from said fluid inlet and for redirecting the flow of said received fluid to provide a fluid flow tangential to said outer periphery of said outer rotor;

said fluid being effective to flow through said openings in said outer rotor and said Coriolis rotor;

a fluid shear decoupler rotable in unison with said outer rotor about said center axis of rotation and positioned within a recess of said Coriolis rotor;

openings in said fluid shear decoupler extending from said openings in said Coriolis rotor to said fluid outlet of said Coriolis flowmeter; and said openings in said fluid shear decoupler being responsive to said fluid flow for converting a rotating radial fluid flow received from said openings of said Coriolis flowmeter to an axial fluid flow applied to said fluid outlet.

29. The Coriolis flowmeter of claim 2 wherein:
both said fluid inlet and said fluid outlet are positioned coaxial with said center axis of rotation of said rotors;
said Coriolis flowmeter further comprising:
a conical element comprising part of a fluid shear decoupler positioned so that its tip end is adjacent said fluid inlet;
a plurality of elongated fins each having an end affixed to the periphery of said conical element and each having another end adjacent said fluid inlet;
said conical element being affixed to said outer rotor to rotate in unison with said outer rotor;
said conical element and said fins, being effective for receiving an axial flow of said fluid from said fluid inlet and for redirecting said flow to provide a rotating angular fluid flow to the inner end of said openings of said Coriolis rotor;
said fluid being effective to flow through said openings in said Coriolis rotor and said outer rotor for rotating both of said rotors; and means for extending said fluids from said openings of said outer rotor to said fluid outlet of said flowmeter; and
means for limiting the angular offset of said Coriolis rotor with respect to said outer rotor.

30. The Coriolis flowmeter of claim 2 in combination with a fluid shear decoupler means positioned intermediate said Coriolis rotor and said fluid outlet;
means for rotating said fluid shear decoupler about said center axis of rotation in unison with said outer rotor;
means on said fluid shear decoupler means for receiving an angular fluid flow from said holes of said Coriolis rotor;
means on said fluid shear decoupler for converting said angular fluid flow to an axial flow; and
means on said fluid shear decoupler for applying said axial fluid flow to said fluid outlet.

31. The Coriolis flowmeter of claim 2 in combination with fluid shear decoupler means positioned intermediate said Coriolis rotor and said fluid inlet;
means for rotating said fluid shear decoupler about said center axis of rotation in unison with said outer rotor;
means on said fluid shear decoupler means for receiving an axial fluid flow from said fluid inlet;
means on said fluid shear decoupler for converting said axial fluid flow to an angular fluid flow; and
means on said fluid shear decoupler for applying said angular fluid flow to the inner extremity of said holes of said Coriolis rotor.

32. A method of operating a Coriolis flowmeter comprising the steps of:
extending a received fluid flow through fluid paths of a rotor positioned within a housing and having a center axis of rotation, as well as through fluid paths of a Coriolis detection means having a center of rotation coaxial with said center axis of rotation of said rotor;
rotating both said rotor and said Coriolis detection means about said center axis of rotation using energy derived from said extension of said fluid while said fluid is extended through paths of said rotor and said Coriolis detection means;
said Coriolis detection means assuming an angular offset from said rotor about said center axis of rotation in response to Coriolis forces generated by said fluid extension and the concurrent rotation of said rotor and said Coriolis detection means;
generating output signals indicative of the magnitude of said angular offset; and
deriving the mass flow rate of said flowing fluid in response to the generation of said signals.

33. A method of operating Coriolis flowmeter comprising the steps of:
extending a received fluid flow from a fluid inlet of said Coriolis flowmeter through a plurality of openings in an outer rotor positioned within a housing of said Coriolis flowmeter as well as through a plurality of openings in a Coriolis rotor at least a part of which is positioned in a recess in said outer rotor;
said outer rotor and said Coriolis rotor having a common coaxial center axis of rotation;
each of said openings in said Coriolis rotor extending from the outer periphery of said Coriolis rotor to a center recess of said Coriolis rotor;
each of said openings in said outer rotor extending from an outer periphery of said outer rotor to said recess of said outer rotor with at least some of said openings in said outer rotor being substantially aligned with corresponding ones of said openings in said Coriolis rotor;
rotating both said outer rotor and said Coriolis rotor about said center axis of rotation using energy derived from said fluid while said fluid is extended through said openings of said Coriolis rotor and said outer rotor;
wherein said fluid is extended by said rotors to a fluid outlet from which said fluid is discharged from said Coriolis flowmeter;
said Coriolis rotor assuming an angular offset from said outer rotor about said center axis of rotation in response to Coriolis forces generated by said fluid extension and to the concurrent rotation of said outer rotor and said Coriolis rotor;
generating output signals indicative of the magnitude of said angular offset; and
deriving the mass flow rate of said flowing fluid in response to said generation of output signals.

34. The method of claim 33 wherein said method comprises the step of:
causing said outer rotor and said Coriolis rotor to rotate about said center axis of rotation in response to said fluid flow through said openings of said outer rotor and said Coriolis rotor so that the tangential velocity of the outer periphery of said outer rotor is substantially greater than the tangential velocity of said fluid at said outer periphery of said outer rotor.

35. The method of claim 33 in combination with a step of limiting the amount by which said Coriolis rotor can be angularly offset with respect to said outer rotor.

36. The method of claim 33 wherein said method comprises the steps of:
directing said fluid flow through a right angle element on the outer periphery of said outer rotor;
said right angle element having a first and a second opening disposed substantially 90 degrees with respect to each other;
said first opening being substantially flush with an inner circumferential surface defining an inner periphery of said recess of said outer rotor;
said second opening being positioned near and oriented substantially perpendicular to the outer periphery of said outer rotor and facing away from the direction of tangential fluid flow proximate to said outer periphery of said outer rotor;

extending said fluid flow from said right angle elements through said openings of said Coriolis rotor to cause said outer rotor and said Coriolis rotor to rotate about said center axis of rotation so that the tangential velocity of the outer periphery of said outer rotor is substantially greater than the tangential velocity of said fluid at said outer periphery of said outer rotor;

said second opening of each of said right angle elements being effective to scoop said fluid at said outer periphery of said outer rotor into an interior of said right angle elements and through said openings of said Coriolis rotor and out of a fluid outlet of said flowmeter; and said right angle elements being effective to reduce the angular rotational velocity of said outer rotor to reduce the pressure drop of said fluid across said meter.

37. The method of claim 33 wherein said method comprises the steps of:

extending said fluid flow through a first opening substantially flush with said outer periphery of said outer rotor and curved to define a jet-like opening for each said opening in said outer rotor; and said first opening being effective to accelerate the flow of said fluid out of said flowmeter via said fluid outlet.

38. The method of claim 37 in combination with the step of:

operating a motor connected to said outer rotor for rotating both said outer rotor and said Coriolis rotor about said center axis of rotation at an increased rotational velocity with respect to the rotational velocity caused by said fluid flow; and both said outer rotor and said Coriolis rotor being responsive to said increased rotational velocity for increasing the pressure of said fluid in said openings and, in turn, the throughput of said fluid through said flowmeter.

39. The method of claim 33 in combination with the steps of:

rotating a fluid shear decoupler means about said center axis of rotation in unison with said outer rotor;

said fluid shear decoupler means being positioned intermediate said Coriolis rotor and said fluid outlet;

applying a rotating radial fluid flow from said openings of said Coriolis rotor to said fluid shear decoupler means;

converting a rotating radial fluid flow to an axial flow; and applying said axial fluid flow from said fluid shear decoupler to said fluid exit.

40. The method of claim 33 in combination with the steps of:

rotating a fluid shear decoupler means positioned intermediate said Coriolis rotor and said fluid inlet about said center axis of rotation in unison with said outer rotor;

applying an axial fluid flow from said fluid inlet to said fluid shear decoupler means;

said fluid shear decoupler means converting said axial fluid flow to a rotating radial fluid flow as said fluid passes through said fluid decoupler means; and said fluid shear decoupler means applying said rotating radial fluid flow to the inner extremity of said holes of said Coriolis rotor.

* * * * *